United States Patent
Mohammad et al.

(10) Patent No.: US 11,823,368 B1
(45) Date of Patent: Nov. 21, 2023

(54) AUTOMATED ROAD SURFACE CONDITION QUALITY ASSESSMENT USING SMART (IOT) DEVICES

(71) Applicant: Prince Mohammad Bin Fahd University, Dhahran (SA)

(72) Inventors: Nazeeruddin Mohammad, Dhahran (SA); Majid Ali Khan, Dhahran (SA); Ahmed Abul Hasanaath, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 18/193,839

(22) Filed: Mar. 31, 2023

(51) Int. Cl.
G06K 9/00 (2022.01)
G06T 7/00 (2017.01)
H04W 64/00 (2009.01)
G06V 20/56 (2022.01)
H04N 7/18 (2006.01)
G06V 10/82 (2022.01)

(52) U.S. Cl.
CPC .......... *G06T 7/0002* (2013.01); *G06V 10/82* (2022.01); *G06V 20/588* (2022.01); *H04N 7/183* (2013.01); *H04W 64/00* (2013.01); *G06T 2207/20081* (2013.01); *G06T 2207/20084* (2013.01); *G06T 2207/30168* (2013.01)

(58) Field of Classification Search
CPC ......... G06T 7/0002; G06T 2207/20081; G06T 2207/20084; G06T 2207/30168; G06V 10/82; G06V 20/588; H04N 7/183; H04W 64/00
USPC ........................................................ 382/157
See application file for complete search history.

(56) References Cited

U.S. PATENT DOCUMENTS

2020/0152053 A1   5/2020   Rogers
2022/0227353 A1   7/2022   Cserna et al.

FOREIGN PATENT DOCUMENTS

CN          110658209 A      1/2020

OTHER PUBLICATIONS

Gonal, Ameya Mahadev, and B. Chirag Baliga. "Road Damage Detection and Classification using YOLOv5 on an Android Device." (Year: 2022).*

(Continued)

*Primary Examiner* — Jonathan S Lee
(74) *Attorney, Agent, or Firm* — Oblon, McClelland, Maier & Neustadt, L.L.P.

(57) ABSTRACT

A system and methods for assessing road surface quality includes a wireless mobile device having a camera, a location receiver, and a road surface classifying computer application and is configured to be mounted on a vehicle. The system has a remote server having a road surface classifying web application, a database, and an interactive map connected to the web application. The mobile device actuates the camera to record videos, extract images from the videos, process the images, classify the images into road conditions, record a location of the images, generate a data packet including an identification of the mobile device and a time stamp of the data packet, and transmit the data packet to the remote server. The remote server stores the data packet in the database. The web application superimposes the time stamp of the data packet, the location, the road conditions, and the images on the interactive map.

19 Claims, 18 Drawing Sheets

(56) References Cited

OTHER PUBLICATIONS

Ramesh, Akshatha, et al. "Cloud-based collaborative road-damage monitoring with deep learning and smartphones." Sustainability 14.14 (2022): 8682. (Year: 2022).*

Munir, Mohamad Faiq Mohd Shahrul, et al. "Real-Time Automated Road Damages Inspection Using Deep Convolutional Neural Networks." International Journal on Perceptive and Cognitive Computing 9.1 (2023): 122-127. (Year: 2023).*

Garcea, Fabio, et al. "Self-supervised and semi-supervised learning for road condition estimation from distributed road-side cameras." Scientific reports 12.1 (2022): 22341. (Year: 2022).*

Sakaino, Hidetomo. "DeepReject and DeepRoad: Road Condition Recognition and Classification Under Adversarial Conditions." 2022 21st IEEE International Conference on Machine Learning and Applications (ICMLA). IEEE, 2022. (Year: 2022).*

Morishita, Shigeya, et al. "Sakurasensor: Quasi-realtime cherry-lined roads detection through participatory video sensing by cars." Proceedings of the 2015 ACM International Joint Conference on Pervasive and Ubiquitous Computing. 2015. (Year: 2015).*

Nautiyal, Akhilesh, and Sunil Sharma. "Condition Based Maintenance Planning of low volume rural roads using GIS." Journal of Cleaner Production 312 (2021): 127649. (Year: 2021).*

Alam, Munshi Yusuf, et al. "LiSense: Monitoring city street lighting during night using smartphone sensors." 2018 IEEE international conference on data mining workshops (ICDMW). IEEE, 2018. (Year: 2018).*

Alam, Munshi Yusuf, et al. "Urban Safety as a Service During Bike Navigation: My Smartphone Can Monitor My Street-Lights." 2020 IEEE International Conference on Smart Computing (SMARTCOMP). IEEE, 2020. (Year: 2020).*

Raslan et al. ; IoT for measuring road network quality index; Neural Computing and Applications ; Mar. 16, 2022 ; 18 Pages.

Ng et al ; Identication of Road Surface Conditions using IoT Sensors and Machine Learning ; Computational Science and Technology; 2019 ; 2 Pages.

Bosi et al. ; In-Vehicle IoT Platform Enabling the Virtual Sensor Concept: A Pothole Detection Use-case for Cooperative Safety ; Proceedings of the $4^{th}$ International Conference on Internet of Things, Big Data and Security (IoTBDS 2019) ; 0 Pages.

Hasanaath et al ; Continuous and Realtime Road Condition Assessment Using Deep Learning ; Department of Computer Science College of Computer Engineering and Science, Prince Mohammad Bin Fahd University ; 7 Pages.

* cited by examiner

Road Monitoring Priority List

| Priority | Road Name | Good Patches (Weight 0) | Medium Patches (Weight 1) | Bad Patches (Weight 2) | Unpaved patches (Weight 3) | Weighted Sum |
|---|---|---|---|---|---|---|
| 1 | Road A | 4 | 5 | 10 | 5 | 40 |
| 2 | Road B | 10 | 7 | 4 | 4 | 21 |
| 3 | Road C | 5 | 2 | 8 | 1 | 20 |
| 4 | Road D | 7 | 2 | 3 | 4 | 20 |

AUTOMATED ROAD SURFACE CONDITION QUALITY ASSESSMENT USING SMART (IOT) DEVICES

STATEMENT REGARDING PRIOR DISCLOSURE BY THE INVENTORS

Aspects of this technology were presented under the title: "Continuous and Realtime Road Condition Assessment Using Deep Learning" at the 2022 International Conference on Connected Systems & Intelligence (CSI) 2022, which is incorporated herein by reference in its entirety.

BACKGROUND

Technical Field

The present disclosure is directed to a system for monitoring deteriorating road conditions in real time using custom and pre-trained deep learning models.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Maintenance of road infrastructure is critical to avoid causing wear and tear to the mechanical systems of cars, drastically reducing their life span. Road infrastructure should be monitored to determine the conditions of the roads and their state of repair. Current systems involve manual monitoring of the roads, which is labor and time intensive. Therefore, an automated process that continuously monitors road conditions is needed. Some of the current navigation technologies use road conditions as one of the parameters for determining a navigation route. For example, vehicle navigation algorithms employed by services like Google Maps look at road quality data to determine a best route. Another example is an Advanced Driver Assistance System (ADAS) which monitors road quality to adjust drive settings. There have been several previous studies to identify road conditions, however, many of these studies are limited to identifying road types (asphalt, bricks, and the like) or identifying road surface conditions based on weather (dry, wet, snow, and the like). Some conventional road monitoring systems focus on identifying specific types of damage (pothole and/or crack detection) using computer vision-based object detection techniques. Data sources in these conventional real-time monitoring systems vary between special vehicle-mounted cameras with motion sensors, vehicle-mounted mobile phone cameras and satellite images, and the like.

In an existing road surface quality monitoring system, accelerometer data and GPS data are used to determine road quality evaluations, however, this approach lacks scalability, due to the data not being readily and publicly accessible. (See: Saurabh Tiwari, Ravi Bhandari, and Bhaskaran Raman, "*Roadcare: A deep-learning based approach to quantifying road surface quality*", Pages 231-242, 06 2020). Another road surface quality monitoring system lacks practicality because it requires an extensive data collection process of over 36 hours of driving through poor road conditions. In some studies, the focus is on road damage detection rather than road quality classification. Road damage detection includes identification of longitudinal linear cracking, lateral linear cracking, alligator cracking, and pothole damage. Models were evaluated on two test datasets. In both cases, they were able to achieve an F1-score (F1-Score is an evaluation metric that is used to express the performance of a machine learning model) of over 6.2. Eight types of damage types were defined. 88.37% accuracy was achieved. (see: Keval Doshi and Yasin Yilmaz, "*Road damage detection using deep ensemble learning*", IEEE International Conference on Big Data (Big Data), pages 5540-5544, 2020, and Xu Lei, Chenglong Liu, Li Li, and Guiping Wang, "*Automated pavement distress detection and deterioration analysis using street view map*", IEEE Access, 8:76163-76172, 2020), Using image based models to assess road quality has been prevalent due to the availability and accessibility of images. Further, customized convolutional neural networks (CNNs) (a network architecture for deep learning that learns directly from data) have been implemented, but more accurate results have been achieved through transfer learning of pre-trained networks. Some researchers have presented image processing systems using transfer learning which provides good performance by using an augmented dataset (75.55%), in which road quality was split into five classes, having practicality in real-world applications. (See: Martin Lank and Magda Friedjungova, "*Road Quality Classification*", and Marco Leo, Giovanni M. Farinella, and Federico Tombari, "*Image Analysis and Processing*", ICIAP 2022, pages 553-563, Springer International Publishing 2022). However, existing image processing systems are complex, resulting in fewer implementations in real-world applications.

Similarly, Rateke et al. [See: Thiago Rateke, Karla Aparecida Justen, and Aldo von Wangenheim., "*Road surface classification with images captured from low-cost camera-road traversing knowledge (RTK) dataset*", Revista de Informatica Teorica e Aplicada, 26:50-64, acquired three datasets, two of which are publicly available. The RTK dataset was collected from a low-cost camera attached to a vehicle. Geiger et al. reported on a road assessment monitor in which LiDAR data was not considered in a CaRINA dataset or a KITTI dataset (see: Andreas Geiger, Philip Lenz, Christoph Stiller, and Raquel Urtasun, "*Vision meets robotics: The KITTI dataset*", International Journal of Robotics Research (IJRR), 2013). However, the CaRINA dataset and the KITTI dataset used only passive vision images, not dynamic images sourced from videos. A conventional road detection system generates a dataset by augmenting the images obtained from several public datasets and crowd-sourced images, however the system requires manual annotation of the images for further processing (see: Gilberto Ochoa-Ruiz, Andres Alonso Angulo-Murillo, Alberto Ochoa-Zezzatti, Lina Maria Aguilar-Lobo, Juan Antonio Vega-Fernandez, and Shailendra Natraj, "*An asphalt damage dataset and detection system based on retinanet for road conditions assessment*", Applied Sciences (Switzerland), 10, 6, 2020).

Road quality assessment can also be performed using LiDAR sensors. A research paper [See: V. N Raj Sudharshan, S. Ramesh, S. Thamodharan, M. Uthavanatha Sarath Santhar, and M. Kamalakannan, "*Pothole and hump recognition using lidar sensor*", 2019, incorporated herein by reference in its entirety] described detection of potholes and bumps on roads using laser sensors. The laser sensors were installed on a vehicle and generated data pertinent to pothole depth and distance from the vehicle. The system alerts the driver with a buzzer when poor road conditions are encountered. This approach operates from laser data and gives accurate results. However, the work [See: American National Standards Institute, "*Safe use of lasers outdoors*", 2016] raises concerns over the widespread use of LiDAR sensors. Prolonged exposure to LiDAR sensor emissions can cause damage to the human eye. Additionally, image analysis based on conventional techniques and systems may involve long hours of training, practice, visual observation, and specialized expertise. Furthermore, known art and other conventional systems do not have the capability to efficiently and accurately classify images.

US20200152053A1 describes a road sensor and a processor for receiving data from the sensor, uses machine learning to recognize conditions local to the sensor from the sensor data and provides an output signal of the conditions. The processor utilizes the various sensor data to classify road attributes not specific to any one vehicle, such as noise and vibration indicative of a nearby pothole or roadway damage, temperature and moisture, indicating dangerous icing conditions, or the likelihood of a detected traffic incident or accident. The processor is trained using machine learning based training to learn different patterns of sound, vibration, and other sensor data sources that correspond to traffic insight into events of interest. However, this publication relies upon a plurality of different types of sensors to generate the data, not just image sensors. Further, the reference is directed to determining road conditions for operating a particular vehicle (autonomous) and not to conduct county-wide or city-wide road monitoring from data collected by a plurality of vehicles with IoT sensors.

CN110658209A describes a vehicle-mounted road defect detection method, which includes collecting road image information by a vehicle image collecting device and transmitting the road image information to a remote detection manager through a wireless network. In the detection manager, road image information is trained by a deep learning approach. The defect information is classified and judged as the detection result. The detection result is transmitted to road maintenance terminals through the network. A GPS locator is disposed in the image acquisition device. The image acquisition device installed on the vehicle is transmitted to detection management terminal through the wireless network, and the detection management terminal locates and classifies road defects through deep learning and can realize accurate detection of road defects quickly and in real-time. However, this reference relies on conventional image processing techniques without considering the quality of images. Also, the detection management terminal simply detects and locates the road defects. A user has to put efforts to identify the location of the road defect without any visual aid.

Accordingly, it is one object of the present disclosure to provide systems and methods for assessing the quality of a road surface with a wireless mobile device mounted on a vehicle by recording dynamic images of the road surface and classifying extracted image frames of the road surface on the wireless mobile device in real time by using a customized deep learning model. The wireless mobile device transmits the classified image frames to a remote server for display on an interactive map.

SUMMARY

In an exemplary embodiment, a system for assessing road surface quality is described. The system includes a plurality of vehicles configured for travelling on a road surface and a plurality of wireless mobile devices. Each wireless mobile device is mounted in one of the plurality of vehicles. Each wireless mobile device includes a camera, a location receiver, an image processor, a wireless communications transceiver, and a computing device connected to the camera, the location receiver, the image processor, and the wireless communications transceiver. The computing device includes a circuitry, a memory including program instructions, and at least one processor configured to execute the program instructions. Each wireless mobile device further includes a road surface classifying computer application stored in the memory. The system further includes a remote server operatively connected with each wireless communications transceiver and configured to store a road surface classifying web application. The road surface classifying computer application of each wireless mobile device is configured to register with the road surface classifying web application. Each wireless mobile device is configured to actuate the camera to record videos of the road surface, process the videos to extract images, classify the images into road conditions, record a location of each of the images, generate a data packet including an identification of the wireless mobile device, a time stamp of the data packet, the location, the road conditions, and the images, and transmit the data packet to the remote server. The system further includes a database operatively connected to the remote server and an interactive map operatively connected to the road surface classifying web application. The remote server is configured to receive the data packet from each wireless mobile device and store the identification of the wireless mobile device, the time stamp of the data packet, the location of the wireless mobile device, the road conditions, and the images in the database. The road surface classifying web application is configured to superimpose the time stamp of the data packet, the location, the road conditions, and the images on the interactive map.

In another exemplary embodiment, a method for assessing road surface quality is described. The method includes actuating, by a wireless mobile device mounted on a vehicle travelling on the road surface, the wireless mobile device including a camera, an image processor, a location receiver, a memory storing program instructions, a deep learning classifier and a processor configured for executing the program instructions, wherein the program instructions include a road surface monitoring computer application, the camera to record videos of the road surface. The method further includes extracting, by the image processor, images from the videos, recording, by the location receiver, a location of each of the images, discarding, by the processor, distorted images and unclear images, resizing and formatting, by the image processor, the images, classifying, by the deep learning classifier, the images into road conditions, and generating, by the wireless mobile device, a data packet including an identification of the wireless mobile device, a time stamp of the data packet, the locations of the images, the road conditions, and the images. The method further includes transmitting, by the wireless mobile device, the data packet to a remote server. The remote server includes a road surface classifying web application and is operatively connected to a database. The method further includes receiving, by the remote server, the data packet from each wireless mobile device and storing the identification of the wireless mobile device, the time stamp of the data packet, the location of the wireless mobile device, the road conditions, and the images in the database. The method further includes superimposing, by the road surface classifying web application, the time stamp of the data packet, the location, the road conditions, and the images on an interactive map.

In yet another exemplary embodiment, a method for assessing quality of a plurality of road surfaces is described. The method includes receiving, by a road surface classifying web application stored in a remote server, data packets from each of a plurality of wireless mobile devices mounted on vehicles travelling on one of the road surfaces. Each data packet includes time-stamped images of the road surface, locations of the images and road conditions based on the images. The method further includes storing the time-stamped images of the road surface, the locations of the images and the road conditions in a database operatively connected with the road surface classifying web application, averaging, by the road surface classifying web application, the road conditions for each location, and superimposing, by the road surface classifying web application, the time stamp of the data packet, the location, the road conditions, and the images on an interactive map.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 6 is an exemplary graphical interface showing a prioritized list of roads based on collected road assessment data, according to certain embodiments.

DETAILED DESCRIPTION

Figure 1A:
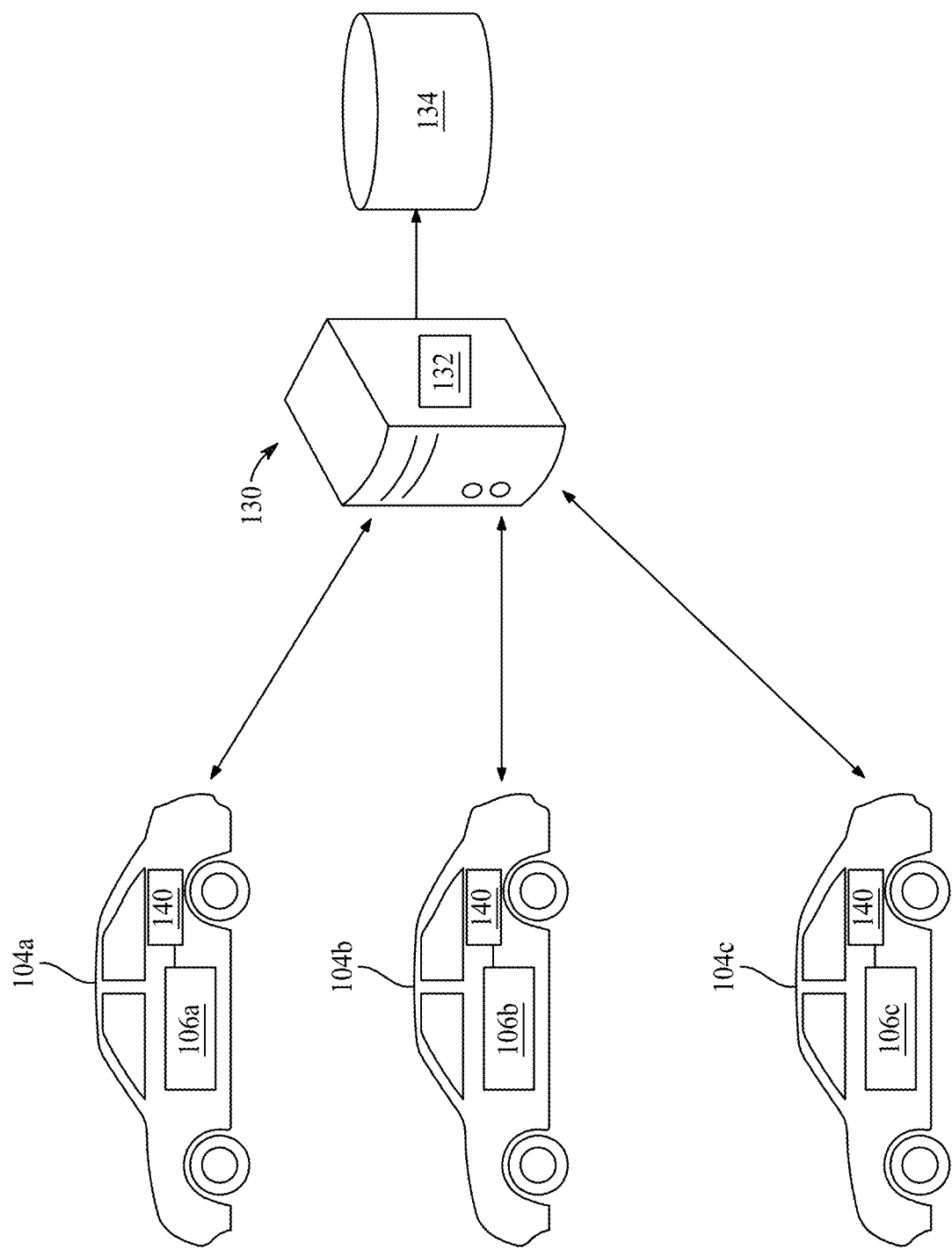
FIG. 1A is an overview of a system for assessing road surface quality, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Definitions of one or more terms used in the present disclosure are provided below.

The term "rutting" is the formation of valleys in the surface of asphalt roads.

The term "shoving" is the presence of small mounds or ripples in the road surface, caused by horizontal stresses. Intersections and highway off-ramps are common areas that exhibiting shoving characteristics.

The term "MobileNet-v2 (MobileNetV2)" is a conventional feature extractor for object detection and segmentation. In an example, the MobileNet-v2 is a convolutional neural network (CNN) with 53 layers. The MobileNetV2 uses inverted residual blocks with bottle-necking features. The MobileNetV2 has a lower parameter count and supports any input size greater than 32×32.

The term "VGG (Visual Geometry Group) 16 (VGG-16)" is an object detection and classification algorithm. VGG16 is used for image classification and is easy to use with a transfer learning.

Aspects of the present disclosure are directed to a system and methods for continuously monitoring deteriorating road conditions in real-time and assessing the quality of the road surface. More specifically, the system continuously monitors road conditions in a city or a municipality in real time and classifies the road conditions into different categories, such as, for example, good, medium, bad, pothole, shoving, rutting, and unpaved, using a customized deep learning model. The monitoring of road conditions may be performed by a monitoring device which may be alternately referred to as a local processing unit (LPU), a smartphone, or a wireless mobile device. The monitoring device captures dynamic images, also referred to as videos, of the road surface. Image frames extracted from the dynamic images are classified in real time on the monitoring device. The system of the present disclosure classifies the road conditions into four different categories, such as good, medium, bad, and unpaved, using a custom-built model, and a transfer learning model from a number of pre-trained deep learning models (such as VGG16 based model and MobileNetV2 based model). Datasets (extracted image frames from close-up videos of the road surface) are collected from a road surface classifying computer application installed on each of the monitoring devices at regular intervals while traveling on roads in real-time. In a data-capturing mode, an application helps to easily tag (or label) the captured images for model training purposes. Initially, dynamic images as videos are recorded on the wireless mobile device attached to the vehicle. To process and categorize the data, a python script was used that displayed the video frame by frame. In a classification mode, the application uses a deep learning model which is developed to classify the captured image frames into various categories (good, medium, bad, and unpaved). The application transmits the classified images to a central server along with longitude and latitude information to update a centralized map of the city. Using a deep learning-based approach, the present disclosure is configured to automatically classify the road conditions, reducing the time, effort, accuracy, and expense of monitoring and maintaining road surfaces. The deep learning-based approach provides an accuracy of 98.6% for classifying road conditions based on video captured during real-time driving of the vehicle.

Figure 1B:
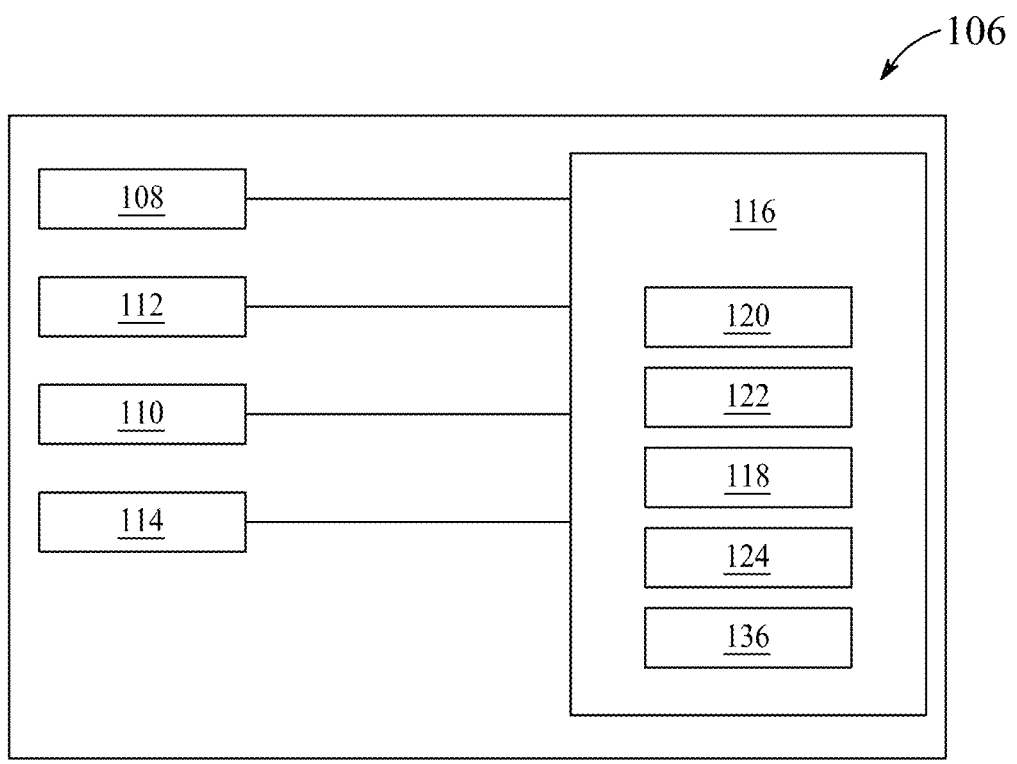
FIG. 1B is a schematic block diagram of a wireless mobile device, according to certain embodiments.

FIG. 1A—FIG. 1B illustrate an overall configuration the system for assessing road surface quality 100. FIG. 1A illustrates a network diagram of the system for monitoring the road surface 100 (hereinafter interchangeably referred to as "the system 100"). FIG. 1B is a schematic block diagram of a computing device of the system 100.

Referring to FIG. 1A, the system 100 includes a plurality of vehicles 104a, 104b, 104c (hereinafter interchangeably referred to as "the plurality of vehicles 104" or "vehicle 104"), a plurality of wireless mobile devices 106a, 106b, 106c (hereinafter interchangeably referred to as "the plurality of wireless mobile devices 106" or "wireless mobile device 106"), a light sensor 140, a remote server 130, and a database 134.

Referring to FIG. 1A, each wireless mobile device 106 is mounted in a designated (although the devices can be interchanged) one of the plurality of vehicles 104. The wireless mobile device 106 is configured to capture a plurality of videos of a road surface while the vehicle 104 is traversing over the road surface. Each of the plurality of wireless mobile devices 106, alternatively referred to as 'the smart device 106' or 'the LPU 106', is mounted on the each of the plurality of vehicles 104. The wireless mobile device 106 may be mounted in several possible locations inside the vehicle 104. In one example, the wireless mobile device 106 may be mounted on a front side near a windshield or attached behind the rear view mirror so as to face the front windshield of the vehicle 104. In another example, the wireless mobile device 106 may be mounted on a rear side, such as on the rear window of the vehicle 104. The wireless mobile device 106 should be mounted on the vehicle 104 in such a way that videos of the road surface surrounding the vehicle 104 may be captured. In some examples, the wireless mobile device 106 may be mounted near a rear window or near a front window on the inside of the vehicle 104. The wireless mobile device 106 is not a custom built-in sensor of the vehicle 104. The wireless mobile device 106 relies on widely available smartphones and the sensors built into these smartphones, for example, cameras and GPS. In an aspect, the wireless mobile device 106 may be mounted on a holder, placed inside in the vehicle 104. In an example, the holder may attach to the dashboard, windshield, rear view mirror or rear window of the vehicle, in such a way that videos of the road surface surrounding the vehicle 104 may be captured. The wireless mobile device 106 can be easily installed and removed from the holder.

The wireless mobile device 106 may facilitate performing image classification of extracted frames of the captured videos of the road surface. The wireless mobile device 106 is operatively connected to the database 134 and the remote server 130. In some examples, the wireless mobile device 106 includes communication capabilities (e.g., through cellular, Bluetooth, hotspot and/or Wi-Fi), allowing communication with other wireless mobile devices 106 and/or the remote server 130. The wireless mobile device 106 may be any device, such as a mobile device, smartphone, PDA, computer, GPS device, a cellular telephone, such as a smartphone, a tablet, or any other small, portable computing device with communication, image processing and computer processing capability which can store and perform the downloadable mobile application and take videos of the road surface.

The remote server 130 is operatively connected with each wireless mobile device 106. Particularly, the wireless mobile device 106 is configured to be in communication with the remote server 130 via a wireless communications transceiver 114. The remote server 130 is configured to store a road surface classifying web application 132. The road surface classifying web application 132 is coupled/linked with a road surface classifying computer application 124 installed in each wireless mobile device 106. The road surface classifying web application 132 is configured to provide an interactive map 136 to be displayed on the road surface classifying computer application 124. The interactive map 136 is operatively connected to the road surface classifying web application 132. The road surface classifying web application 132 is configured to update the interactive map 136 based on the received data packet from the plurality of wireless mobile devices 106a-106n. In an example, the interactive map 136 is specifically configured for the road surface classifying computer application 124 and uses a mapping application that is already installed in the wireless mobile device 106. The mapping application is implemented to generate the interactive map based on the extracted information, such as the vehicle's current location, a destination specified by a user, a route to be followed by the user, and distance from the destination. The mapping application is configured to render the map on a display screen of the wireless mobile device 106 with the current location of the vehicle with respect to the route to be followed by the user. The road surface classifying computer application 124 may be configured to exchange data with the road surface classifying computer application 124 installed on a different wireless mobile device 106. Each wireless mobile device 106 registered with the road surface classifying web application 132 exchanges its data with the road surface classifying web application 132 to be stored in the database 134. The wireless mobile device 106 tracks a current condition of the road surface based on the updated interactive map 136 displayed on the road surface classifying computer application 124. The road surface classifying computer application 124 may obtain a geographical map associated with the current position of the vehicle 104 via a satellite communication, via Global Position Services (GPS) or via General Packet Radio Services (GPRS).

The database 134 is operatively coupled to the remote server 130 and the road surface classifying web application 132. The database 134 is configured to store data packets received from the plurality of wireless mobile devices. The database 134 is configured to store a user profile associated with each wireless mobile device 106 which has registered with and installed the road surface classifying computer application 124. In an example, the user profile includes a unique ID, address of the user, a list of preferred routes, a list of preferred road conditions, and the like. The database 134 may store the details of vehicles, unique IDs corresponding to the plurality of wireless mobile devices, registration details of each user corresponding to each wireless mobile device, etc.

The wireless mobile device 106 (also referred to as the monitoring device) has a unique ID and may be linked with the remote server 130. Similarly, the road surface classifying computer application 124 in the wireless mobile device 106 may have a unique ID and may be linked with the remote server 130. The remote server 130 stores the road surface classifying web application 132. The remote server 130 may be owned by a government agency or a private company and is configured to analyze the received data for performing several tasks such as managing the road, making repairing of the road, and monitoring the conditions of the roads.

In an example, the remote server 130 may be implemented as one or more microprocessors, microcomputers, microcontrollers, digital signal processors, state machines, logic circuitries, and/or any devices that manipulate signals based on operational instructions. Among other capabilities, the remote server 130 is configured to fetch and execute the pre-determined set of instructions stored in a memory (database 134). In some examples, the remote server 130 may be implemented as any type of computing device for hosting a webpage or website accessible via the network, such as, but without limitation, a web server, application server, cloud server, or other host. For example, the remote server 130 is configured as a management server for performing data communication with respect to the monitored road surface (s). The management server provides access to the hardware resources that are required for establishing network connectivity.

The light sensor 140 may be mounted on the wireless mobile device 106. The light sensor 140 is configured to measure an ambient light level. The light sensor 140 may be disposed in the vehicle 104 in a location near a window and be configured to communicate with the computing device 116 of the wireless mobile device 106 by wiring or near field communication. The light sensor 140 may be selected from a group including an ambient light intensity sensor, a visible light sensor, a UV sensor, a UV and blue light sensor or any combination thereof.

Referring to FIG. 1B, the wireless mobile device 106 includes a camera 108 configured to take videos, a location receiver 112, an image processor 110, a wireless communications transceiver 114, and a computing device 116.

The computing device 116 is commutatively coupled to the camera 108, the location receiver 112, the image processor 110, and the wireless communications transceiver 114. The computing device 116 includes a circuitry 118, a memory 120, and at least one processor 122.

In an operative aspect, the computing device 116 is configured to receive the measured ambient light level from the light sensor 140. The computing device 116 is configured to compare the received ambient light level to a threshold fetched from the memory 120 and actuate the camera 108 to record videos of the road surface when the ambient light level is greater than the threshold. The threshold may be a preset value of ambient light level inputted into the system 100 and stored in the memory 120 of the computing device 116.

The camera 108 is configured to capture the video of the road surface. In an example, the lens of the camera 108 is located on an exterior side of the wireless mobile device 106. The camera 108 is connected to the computing device 116, for example, through wiring or through a wireless module. The computing device 116 is configured to actuate the camera 108 to capture the videos and receive the videos from the camera. In an example, the camera 108 is configured to record about 20 videos of the road surface per kilometer of the road surface travelled by the vehicle 104. The camera 108 may be, for example, a high-resolution digital camera, an image capturing sensor, an infrared (IR) camera, a visible light camera, an intensified charge-coupled device (ICCD) camera, an image intensified camera, a sensor fused camera, and the like. A video file is made up of a series of still images. Every individual of these still images is called a frame. In aspects of the present disclosure, image frames are extracted from the videos for use in classification. Image frames are equivalently referred to as "images" in the processing and classifying steps described below.

The memory 120 is configured to store program instructions. The program instructions include a machine learning model that is configured to identify a quality of each image and discard any distorted images or unclear images captured by the camera 108. The program instructions include a deep learning classifier which is trained to classify the images. According to the present disclosure, the deep learning classifier is a convolutional neural network (CNN). The memory 120 is configured to store the machine learning model and a predefined dataset (training dataset) for training the machine learning model. The program instructions include a program that implements a method for using machine-learning methods to classify each captured image in accordance with embodiments of the present disclosure and may implement other embodiments described in this specification. The training dataset of images stored in the memory 120 of the road surface classifying computer application 124 may be regularly updated by the road surface classifying web application 132 as more videos of each section of road surface are gathered by, processed and classified by the wireless mobile devices 106 and transmitted to the remote server 130 from the plurality of wireless mobile devices 106 registered with the road surface classifying web application 132.

The memory 120 is configured to store preprocessed data. The memory 120 is configured to store a plurality of videos, image frames extracted from the videos, a road surface classifying computer application 124, a threshold value related to the ambient light level, and the like. The memory 120 may include any computer-readable medium known in the art including, for example, volatile memory, such as Static Random Access Memory (SRAM) and Dynamic Random Access Memory (DRAM) and/or nonvolatile memory, such as Read Only Memory (ROM), erasable programmable ROM, flash memories, hard disks, optical disks, and magnetic tapes.

The circuitry 118 is configured to employ preprocessing on the received data (videos and extracted image frames), such as filtering and amplifying the received data.

The at least one processor 122 is configured to fetch and execute computer-readable instructions stored in the memory 120. The at least one processor 122 is configured to execute a sequence of machine-readable instructions, which may be embodied in a program or software. The instructions can be directed to the processor 122, which may subsequently program or otherwise be configured to implement the methods of the present disclosure. In some examples, the processor 122 is configured to control and/or communicate with large databases, perform high-volume transaction processing, and generate reports from large databases. The at least one processor 122 may be implemented as one or more microprocessors, microcomputers, microcontrollers, digital signal processors, central processing units, state machines, logic circuitries, and/or any devices that manipulate signals based on operational instructions.

The image processor 110 is configured to receive the captured video from the camera 108 and apply a plurality of image processing techniques on the received video to extract image frames and generate a processed image. In an example, the image processor 110 is configured to resize and normalize the received images to fit a format of the deep learning classifier. The image processor 110 is a programmed processor designed for processing digital images. In some examples, the image processor 110 includes a microcontroller, digital signal processor, or imaging core. As part of mapping the recorded images, the image processor 110 may also perform one or more image editing techniques, e.g., generate the digital image by employing a high dynamic range, noise removal, and so forth. The image processor may determine whether the defects are ruts or shovings by measuring an area around a defect to delineate a road plane and contour mapping the defect to map a height or depth of the defect with respect to the road plane.

The image processor 110 is configured to employ various image processing technique that involves extraction, filtering, enhancement, and the like, of images using processing operations. For example, every digital image has a corresponding matrix of color and color intensities. Various mathematical operations are performed on these matrices to enhance the corresponding image. An image can be regarded as a function $f(x, y)$ of two continuous variables x and y. To be processed digitally, the digital image has to be sampled and transformed into a matrix of numbers.

The wireless mobile device 106 further includes the road surface classifying computer application 124 stored in the memory 120 of the computing device 116. In an operative aspect, the user may register the wireless mobile device 106 with the road surface classifying web application 132 of the remote server 130 using the road surface classifying computer application 124 using a registration interface. In an example, the user may download and install the road surface classifying computer application 124 on a user device (wireless mobile device 106). The registration interface of the road surface classifying computer application 124 may be configured to request that the user create a profile by providing personal information such as name, age, address, contact number and like. In some examples, the road surface classifying computer application 124 is configured to analyze the email, messages, profile information and/or other information to obtain the personal information. In some examples, the road surface classifying computer application 124 may be a mobile application specifically designed for monitoring the road surface and provided by an application distribution platform. Examples of road surface classifying computer application distribution platforms include the App Store for iOS provided by Apple, Inc., Play Store for Android OS provided by Google Inc., and such application distribution platforms. The number of videos of the road surface captured in a predefined time may be controlled using the wireless mobile device 106 through the road surface monitoring computer application.

In some examples, the road surface classifying computer application 124 may receive a plurality of information from the wireless mobile device 106. The plurality of information includes the present location of the wireless mobile device 106, access to a photo gallery of the wireless mobile device 106, access to contact numbers stored in the wireless mobile device 106, access to call history of the wireless mobile device 106, and information that may be received by various mobile applications already installed in the wireless mobile device 106.

The location receiver 112 is configured to identify a location of the vehicle 104 while the vehicle 104 is travelling over the road surface. The location receiver 112 is selected from the group consisting of a global positioning system (GPS) receiver, a Time Difference of Arrival (TDOA) receiver, a cellular-ID approximation receiver, a triangulation system and a network assisted global positioning receiver.

The wireless mobile device 106 is configured to receive the processed data from the computing device 116 and the location of the vehicle 104 from the location receiver 112, respectively. The wireless mobile device 106 is configured to generate a data packet including an identification of the wireless mobile device, a time stamp of the data packet, the location, the road conditions, and the classified images.

The wireless mobile device 106 is configured to transmit the generated data packet via the wireless communications transceiver 114. In an example, the wireless communications transceiver 114 has at least one antenna for transmitting and receiving communications packets or records to/from the server via a wireless access node. In some examples, at least one antenna is a near field antenna, a WiFi antenna, and a radio frequency antenna. The wireless communications transceiver 114 may include a wireless-frequency transceiver having a variable gain amplifier that generates radio-frequency signals for transmission. A wireless amplifier circuit may be used to amplify the radio-frequency signals at the output of the variable gain amplifier for transmission through a plurality of antennas. In an example, the wireless communications transceiver 114 may be a WiFi, Bluetooth, and 4G or 5G receiver.

The wireless mobile device 106 may have communications capabilities that include, but are not limited to, GPS, Bluetooth Low Energy (BLE), Wi-Fi, EDGE, 2G, 3G, 4G, LTE, wired network, Bluetooth®, Near Field Communications (NFC), Infrared (IR), etc.).

The computing device 116 of the wireless mobile device 106 is configured to transmit the data packet to the remote server 130 in real-time. Further, the remote server 130 is configured to receive the data packet from each wireless mobile device 106 and store the identification of the wireless mobile device 106, the time stamp of the data packet, the location of the wireless mobile device 106, the road conditions, and the classified images in the database 134. Further, the road surface classifying web application 132 is configured to superimpose the time stamp of the data packet, the location, the road conditions, and at least one of the classified images and a classified image representative of a roadway section on the interactive map 136.

If the wireless mobile device 106 is unable to establish an active connection with the remote server 130 or the wireless communications transceiver 114 is unable to transmit the data packet in real time, then the computing device 116 is configured store the data packet in the memory 120 until a network connection to the remote server 130 is available (established). More specifically, the computing device 116 is configured to store the data packet in the memory 120 for a preconfigured time interval and send the data packet to the remote server 130 when the preconfigured time interval expires, resulting saving transmission power of the wireless mobile device 106 and providing an energy efficient system.

The road surface classifying web application 132, stored in the remote server 130, is configured to display the road conditions as a plurality of color coded dots, thereby providing a visually attractive user interface on the interactive map 136. In an example, each specific color of the plurality of color coded dots indicates a severity of the road condition. For example, a red color may indicate a poor road, and a green color indicate a good road.

Figure 2:
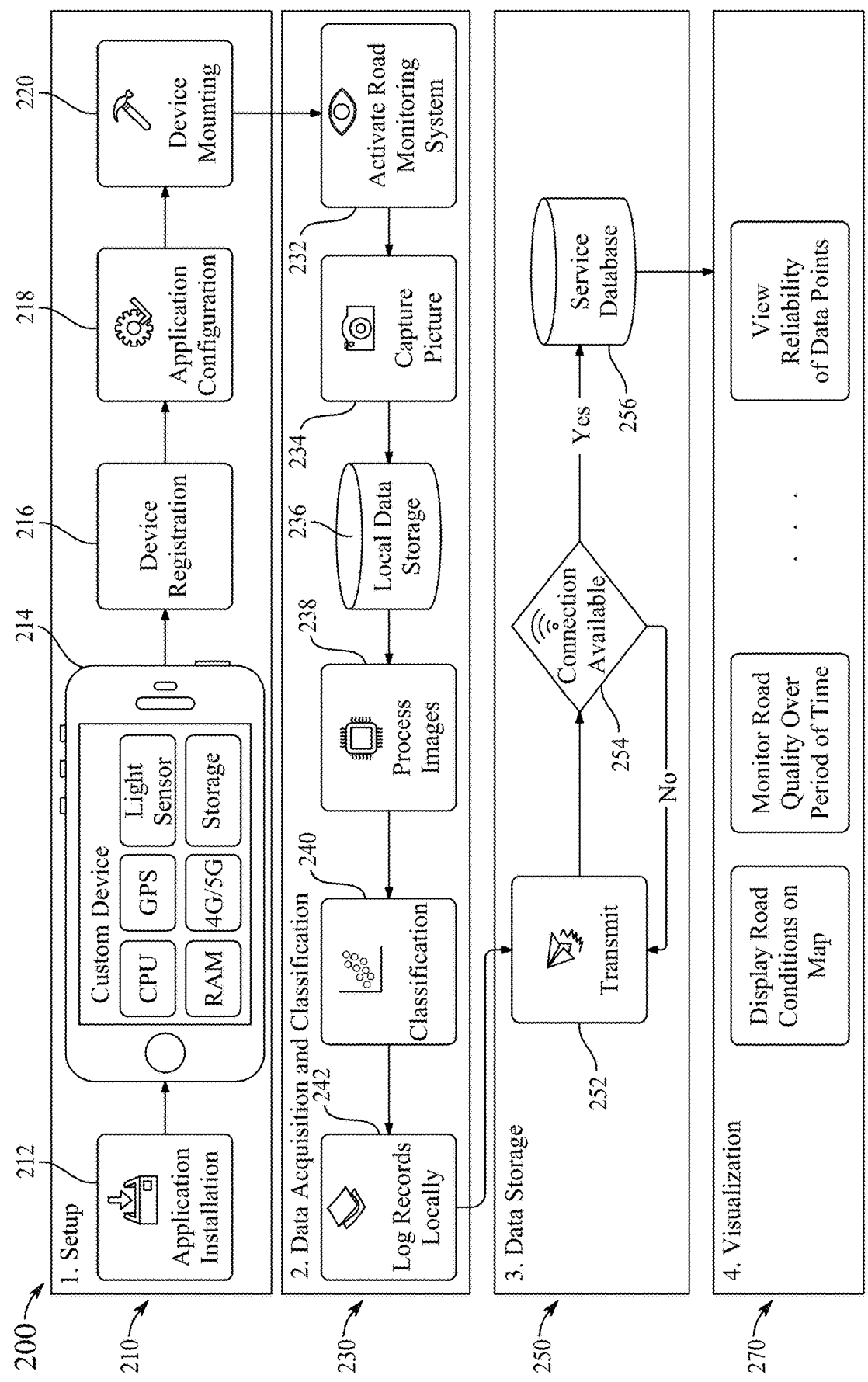
FIG. 2 is an exemplary flowchart illustrating a four-step process for monitoring the road surface, according to certain embodiments.

FIG. 2 is an exemplary flowchart illustrating a four-step process 200 for monitoring the road surface, according to certain embodiments. The four-step process 200 includes a setup step 210, a data acquisition and classification step 230, a data storage step 250, and a visualization step 270.

During the setup step 210, the road surface classifying computer application 124 is installed on the wireless mobile device 106 (as shown by step 212). During step 212, the user is able to apply a number of settings of the installed applications according to his/her preference and according to the configuration of the wireless mobile device 106. Then the road surface classifying computer application 124 is registered with the road surface classifying web application 132 stored in the remote server 130 (as shown by step 216). During the registration, a unique ID may assign to each wireless mobile device 106, and a device registration data packet is transferred to the wireless mobile device 106 as shown in Table 1.

TABLE 1

A device registration data packet.
Device Registration

| Owner ID | LPU Unique ID | App Version | Date Installed | Last Updated |
|---|---|---|---|---|
| uid 1 | UEA4399 | 1.1 | 27 Dec.-2022 | 29 Dec. 2022 |
| uid 2 | UEA4398 | 1.1 | 27 Dec.-2022 | 28 Dec. 2022 |
| . . . | . . . | . . . | . . . | . . . |
| uid n | GEP4198 | 1.1 | 28 Dec.-2022 | 28 Dec. 2022 |

During the setup step 210, the road surface classifying computer application 124 is installed on the wireless mobile device 106 (as shown by 212). During step 218, the user is able to update application configurations. The installed application 124 may be configured to access the plurality of information stored in the wireless mobile device 106. The installed application 124 may be configured with a plurality of application parameters. In an example, the plurality of application parameters includes road condition types, for example, good, medium, bad, pothole, shoving, rutting, and unpaved; video capture frequency (i.e., number of videos per kilometer, for example, 20 videos per kilometer); minimum light intensity (i.e., minimum required light intensity, for example, 100 lux); maximum speed limit (i.e., maximum speed limit of the vehicle 104 for capturing the videos, for example, 80 kmph); a classification algorithm (i.e., the customized machine learning algorithm used for classification on the wireless mobile device 106 based on regions or road conditions); a maximum number of stored images (i.e., maximum number of images stored in the circular buffer in the local storage, for example, 1000); image type storage (i.e., type of road condition images that require the image to be stored, for example, rutting and unpaved road conditions only); data validity (i.e., time after which data on the local storage expires if not transmitted to the remote server 130, for example, 1 month); and sync time (i.e., time interval between the sync of local records from the wireless mobile device 106 to the remote server 130). As a last step (step 220) in the setup step 210, the wireless mobile device 106 may be mounted on the vehicle 104, preferably at the rear side of the vehicle 104 thereof.

During the data acquisition and classification step 230, the system 100 is configured to be activated (step 232). The system 100 may be activated automatically when the engine of the vehicle is turned on (this can be enabled by near field communications with the vehicle or a key fob of the vehicle) or when the mobile wireless device 106 is commanded by the user to open the road surface classifying computer application 124. After the activation of the system, the light sensor 140 is configured to measure an ambient light level in the proximity of the wireless mobile device 106. The computing device 116 of the wireless mobile device 106 is configured to compare the ambient light level measured by the light sensor 140 to the threshold value stored in the memory 120. When the ambient light level is greater than the threshold value, the computing device 116 actuates the camera 108 to record videos of the road surface (step 234). The wireless mobile device 106 further obtains speed and current location (longitude and latitude) of the vehicle 104 using the location receiver 112. The wireless mobile device 106 starts capturing videos of the road surface at a configured distance (for example, one video for every 50 meters) based on the ambient light level. The configured distance may be inputted by the user but is more preferably determined by road statistics associated with the location of the vehicle, and as determined by the road surface classifying computer application 124. For example, a section of road which is recognized as having a poor road surface by previous mapping may require more frequent videos to be taken, whereas a newer section of road or a section of road which had a recent maintenance or is recognized as a good road surface by previous mapping may require fewer videos to be taken, In an example, the captured videos are stored in the memory 120 (as a local file repository on the wireless mobile device 106) as shown by step 236. During the step 238, the image processor 110 extracts the image frames and processes the images according to the format of the deep learning classifier. The computing device 116 may discard any distorted or unclear images. In an example, good quality images (having a clarity above a threshold value) may be provided to the machine learning model. During the step 240, the machine learning model classifies the inputted images into different categories representing a condition of the road surface. The classified images along with time, longitude, and latitude information, are stored in the memory as a local record log file (as shown by step 242). In an example, some of the captured images may be stored as per wireless mobile device configuration (i.e., based on max images and image storage configuration settings). The deployed machine learning model may be customized and periodically updated to the wireless mobile device 106 based on the historical data (as shown in FIG. 3).

The data storage step 250 includes two phases: a data transmission phase, and a data storage phase. In the data transmission phase (step 252), the data from the locally stored log file is transmitted by the wireless mobile device 106 to the remote server 130. In an example, the wireless mobile device 106 transmits the locally stored log file at the user-configured fixed intervals (sync time) or on manual user input. The wireless mobile device 106 is configured to operate either in an offline mode or an online mode to synchronize with the remote server 130. In the offline mode, the wireless mobile device 106 can store the classifications on a local storage of the wireless mobile device 106 and synchronize with the remote server 130 when the network becomes available or at pre-configured intervals. In step 254, the wireless mobile device 106 checks whether a network connection to the remote server 130 is available or not. The wireless mobile device 106 transmits only when the transmission is scheduled and or based on network availability. The locally stored log file transmitted by the wireless mobile device 106 includes the device ID, the time stamp, the longitude of the device, the latitude of the device, the road classification, and the classified images corresponding to the road classification. The wireless mobile device 106 will not transmit all the captured images, on the other hand, the wireless mobile device 106 will transmit only a processed image (classified image), thereby reducing burden on the remote server and utilizing a transmission channel in an efficient manner. In step 256, the remote server 130 stores the data received from the wireless mobile device 106 in the database 134 using a relational model.

Figure 4:
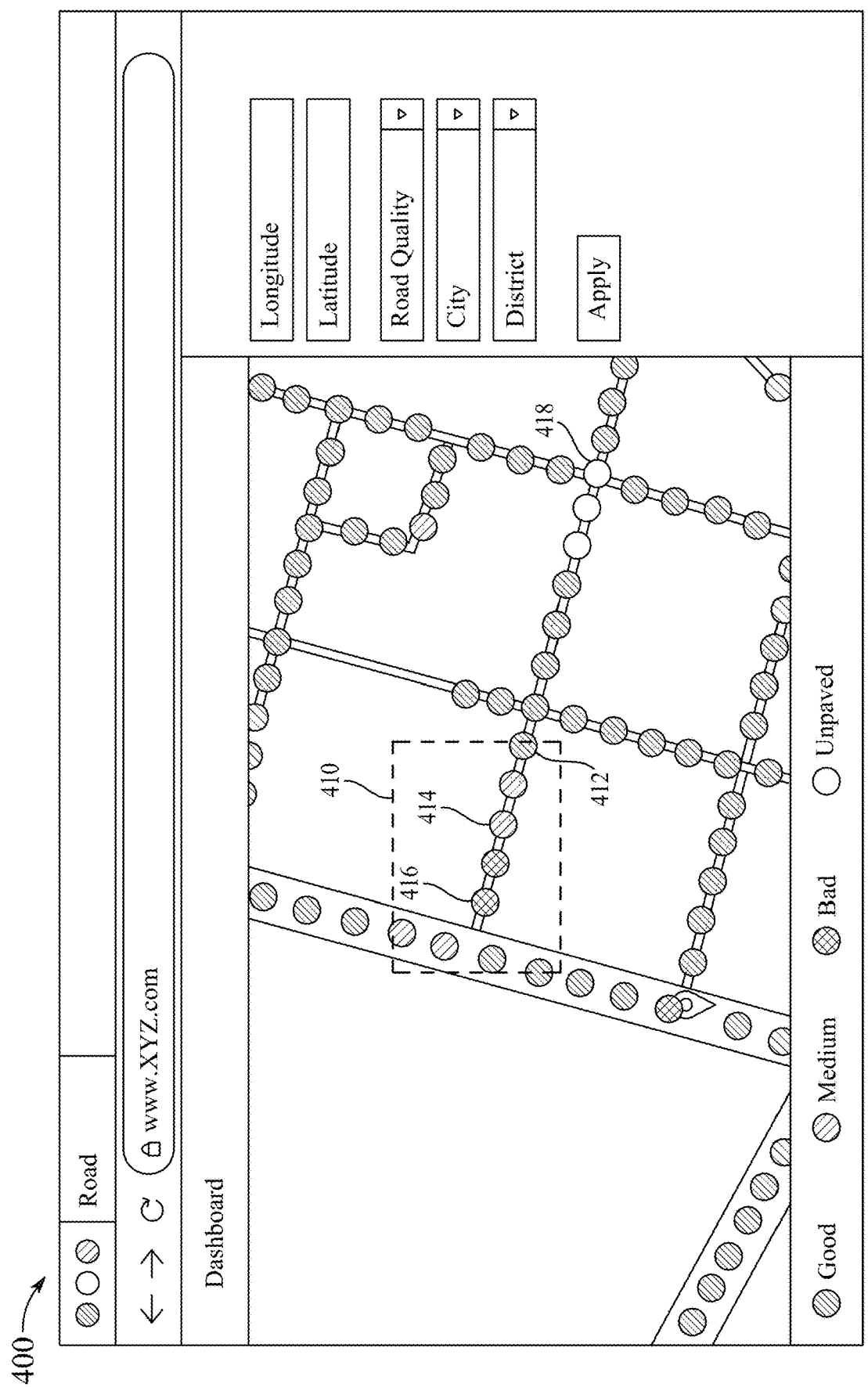
FIG. 4 is an exemplary representation of an interactive map displaying road condition assessment data across a region, according to certain embodiments.

During the visualization step 270, the road surface classifying web application 132 of the remote server 130 superimposes the data fetched from the database 134 on the interactive map 136 (as shown in FIG. 4). The system 100 is configured to display the interactive map 136 based on the data acquired by different wireless mobile devices 106, thereby enhancing reliability of the data. They were used to data for a particular location is shown with a reliability index (as shown in FIG. 4). The road surface classifying web application 132 also has several filters to display selected road assessments, for example, to view only bad road conditions in a specific city.

Figure 3:
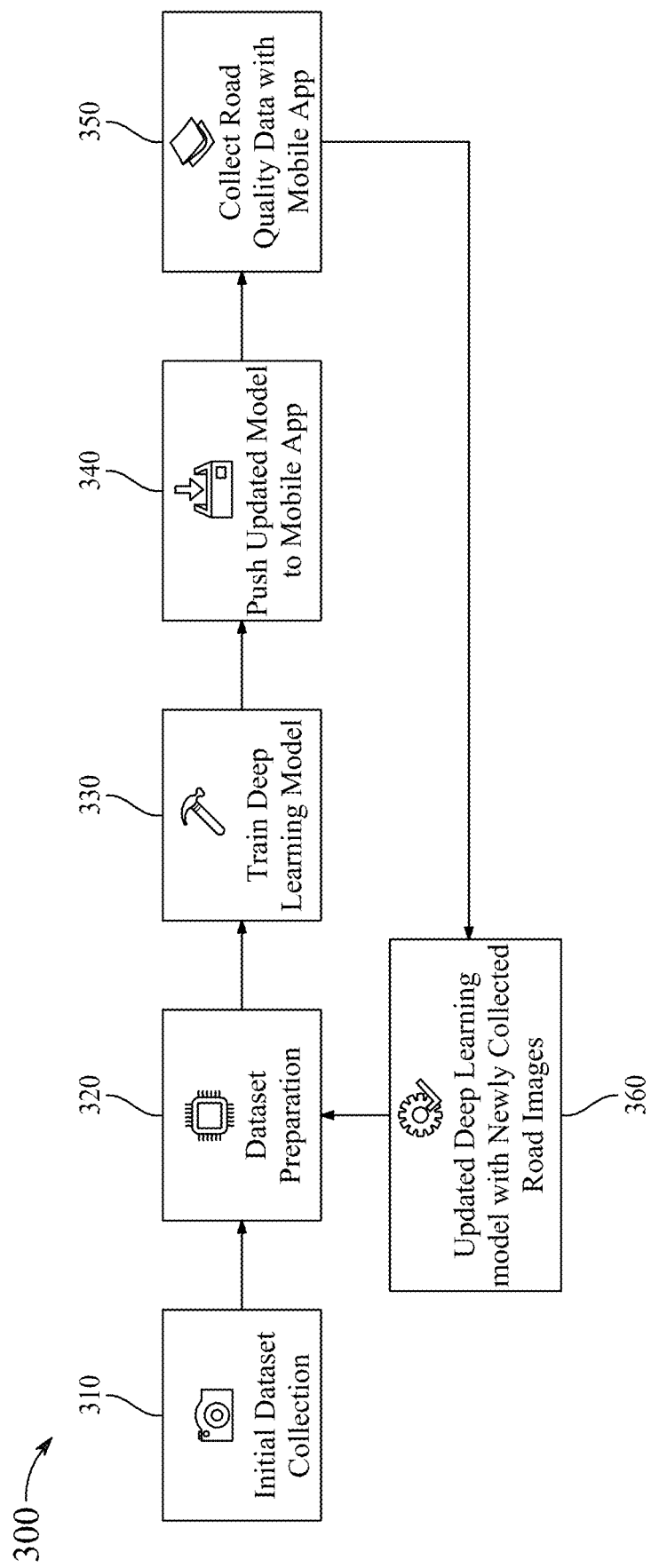
FIG. 3 is an exemplary flowchart illustrating a development and deployment of a custom machine learning model, according to certain embodiments.

FIG. 3 is an exemplary flowchart 300 illustrating a development and deployment of a custom machine learning model (deep learning model).

Step 310 includes collecting initial dataset. The wireless mobile device 106 is mounted on the vehicle 104 travelling on the road surface. On execution of the program instructions, the camera 108 records a plurality of videos of the road surface. The computing device 116 is configured to store the plurality of captured videos in the memory 120. The frequency at which the wireless mobile device 106 captures videos may depend on historical knowledge of the road surface conditions of a section of the roadway, may be set during registration, may be set by the remote web monitoring computing application based on classified images stored in the database, or may be set to record continuously.

Step 320 includes preparing the dataset by resizing and formatting the images by the image processor 110. The image processor 110 is configured to receive the captured video from the camera 108 and apply a plurality of image processing techniques on the received video to extract the image frames and to generate the dataset. In an example, the image processor 110 is configured to process the received images to fit a format of the deep learning classifier. The computing device 116 of the wireless mobile device 106 may discard any distorted or unclear images. In an example, good quality images (having a clarity above a threshold value) may be provided to the machine learning model.

Step 330 includes training the custom machine learning model using the prepared dataset. To train the machine learning model for image segmentation, the prepared dataset is input into the deep learning model. The prepared dataset contains labelled images with an object having boundaries annotated. Then the convolutional neural network (CNN) is being trained on the dataset and the trained CNN is used to predict object boundaries on new images. The machine learning model classifies the inputted images into different categories representing a condition of the road surface. The classified images along with time, longitude, and latitude information is stored in the memory as a local record log file.

Step 340 includes pushing the updated deep learning model to the road surface classifying computer application 124. The road surface classifying web application 132 superimposes the time stamp of the data packet, the location, the road conditions, and the images on the interactive map 136 to be displayed on the road surface classifying computer application 124.

Step 350 includes collecting data packets from the plurality of wireless mobile devices 106. The remote server 130 receives the data packet from each wireless mobile device 106 and stores the identification of the wireless mobile device 106, the time stamp of the data packet, the location of the wireless mobile device, the road conditions, and the images in the database 134.

Step 360 includes updating the deep learning model with newly collected road images and further applying dataset preparation step on the new data to be used in the training of the deep learning model.

FIG. 4 is an exemplary representation of an interactive map 400 displaying road condition assessment data across a region. The road surface classifying web application 132 can display the data as points on the interactive map 400. In an example, point 410 represents a specific area along with the enroute to the destination inserted by the user. As shown in FIG. 4, point 412 represents a road having the good road surface condition. Point 414 represents a road having the medium road surface condition. Point 416 represents a road having the bad road surface condition. Point 418 represents an unpaved road. By clicking on a specific point, the user can see images associated with that specific location. Concerned authorities can work with the road surface classifying web application 132 to monitor and maintain roads at the city level. In FIG. 4, "www.XYZ.com" is merely a representative web address and is not meant to be an actual web address.

Navigation systems heavily rely on road data. Road quality is an important consideration when the user decides which route should be taken to the destination. The database 134 of classified road data, according to the present disclosure, can prove to be essential in path finding algorithms employed by navigation systems.

Figure 5:
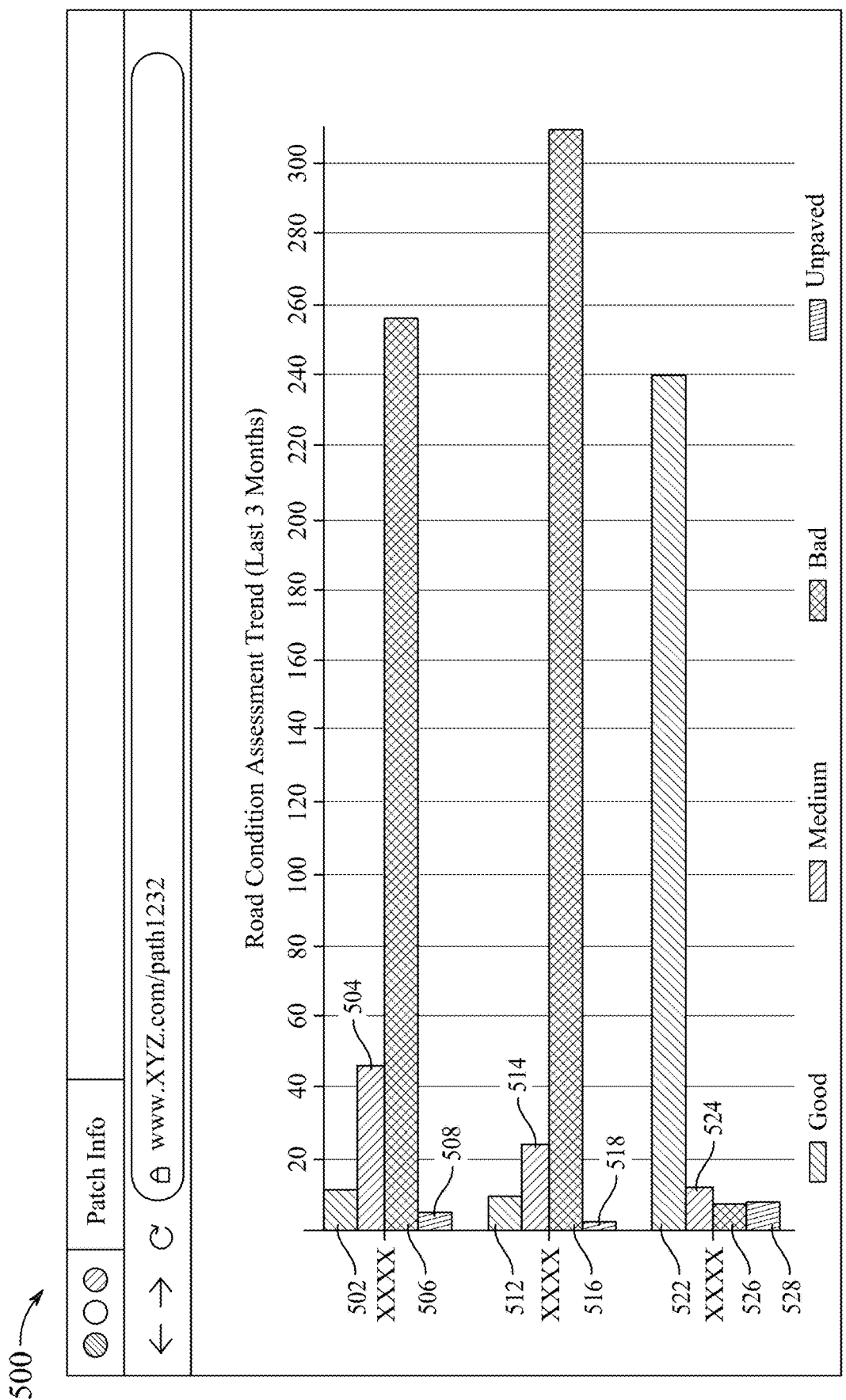
FIG. 5 is an exemplary graphical interface showing a historical trend for determining an evolution of road condition over time, according to certain embodiments.

FIG. 5 is an exemplary graphical interface 500 showing historical data for determining the evolution of road conditions over time. In an example, FIG. 5 shows a road assessment trend over last three months. Users or road management companies can view historical data by selecting any road to see how road conditions have changed over time (as shown in FIG. 5), which can be used to determine road maintenance work. Bar 502 represents the good condition of the road in a first month. Bar 512 represents the good condition of the road in a second month. Bar 522 represents the good condition of the road in a third month. Bar 504 represents the medium condition of the road in the first month. Bar 514 represents the medium condition of the road in the second month. Bar 524 represents the medium condition of the road in the third month. Bar 506 represents the bad condition of the road in the first month. Bar 516 represents the bad condition of the road in the second month. Bar 526 represents the bad condition of the road in the third month. Bar 508 represents an unpaved road in the first month. Bar 518 represents an unpaved road in the second month. Bar 528 represents an unpaved road in the third month. As shown in FIG. 5, during the first month and the second month, the bad condition of the road gradually increases and the good condition reduces. After monitoring the road surface using the system, in the third month maintenance work of the road has been performed and the road in good condition increases again, as shown by 522. Good, medium and bad conditions are determined by criteria during road classification and are related to the severity, depth, type of damage and frequency of damages on a road surface section.

Figure 7:
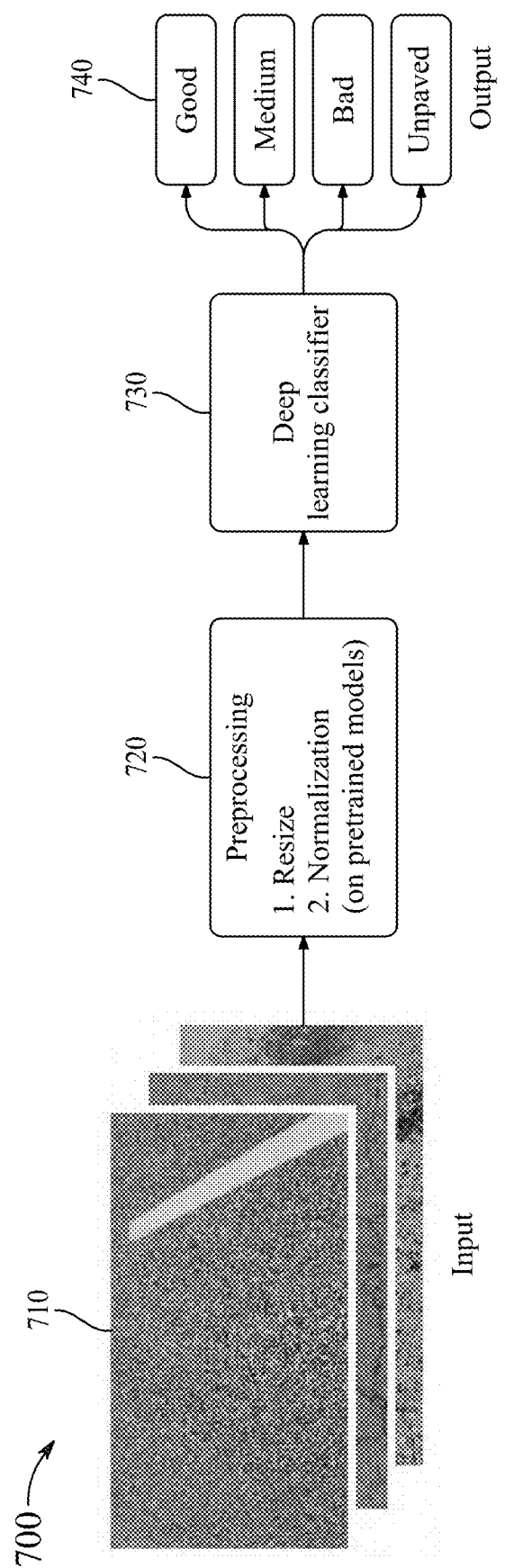
FIG. 7 is an exemplary flowchart illustrating a two-step process for classification of the road surface, according to certain embodiments.

FIG. 6 is an exemplary graphical interface 600 showing a prioritized list of roads based on collected road assessment data, according to certain embodiments. The road surface classifying web application 132 is configured to generate the prioritized list of roads that require maintenance work (as shown in FIG. 6). The prioritized list is determined based on multiple factors including traffic volume and the location of the road condition. The users may also be able to search the map for different cities and neighborhoods to view their road conditions. FIG. 7 is an exemplary flowchart illustrating a two-step process 700 for classification of the road surface. The two-step process 700 for monitoring road conditions can be performed into two processes namely, an image processing (preprocessing) 720, and a model training (deep learning classifier) process 730, as shown in FIG. 7. During the two-step process 700, the plurality of images (dataset) captured by the wireless mobile device 106 is used as an input 710. The two-step process 700 is configured to classify the input images into four categories and provides the classified images according to the output 740. In an example, the models were trained on Google Colab (by Google Inc., 1600 Amphitheatre Parkway in Mountain View, California). The Convolutional Neural Networks (CNNs) are used to build the deep learning model, which performs the road condition classification task, as shown by 730.

In an operative aspect, the road quality classification is performed in two different ways, namely building a custom CNN and a transfer learning. In total, three models were trained in the system 100. The three models are named according to their architecture, respectively. For example, a model based on a custom architecture of the present disclosure is named as 'Custom Model'. The model based on a VGG16 architecture [*See: Shuying Liu and Weihong Deng. Very deep convolutional neural network based image classification using small training sample size. In* 2015 *3rd IAPR Asian Conference on Pattern Recognition (ACPR)*, pages 730-734, 2015, incorporated herein by reference] is named as 'VGG Based Model', and similarly, the model based on a MobileNetV2 architecture [See: *Mark Sandler, Andrew Howard, Menglong Zhu, Andrey Zhmoginov, and Liang-Chieh Chen. Mobilenetv2: Inverted residuals and linear bottlenecks. In* 2018 *IEEE/CVF Conference on Computer Vision and Pattern Recognition*, pages 4510-4520, 2018, incorporated herein by reference] is named as 'MNet Based Model'. For example, these three models went through the dataset 10 times, i.e., the number of epochs was set to 10. The performance of dataset used in the present system 100 is compared with the datasets employed in existing classification systems and is summarized in Table 2. Further, a RobotCar Dataset (see: Will Maddern, Geoff Pascoe, Chris Linegar, and Paul Newman, "1 *Year,* 1000 *km: The Oxford RobotCar Dataset*", the International Journal of Robotics Research (IJRR), 36(1):3-15, 2017, incorporated herein by reference in its entirety). The RobotCar Dataset contains over 100 repetitions of a consistent route through Oxford, UK, captured over a period of over a year. The dataset captures many different combinations of weather, traffic and pedestrians, along with longer term changes such as construction and roadworks. Also, a DIPLODOC dataset is also used for compariosn (see:Michele Zanin, Stefano Messelodi, and Carla Modena, "*Diplodoc road stereo sequence*", incorporated herein by reference in its entirety). Further, the RDD2020 dataset is also used for comparison (see: Deeksha Arya, Hiroya Maeda, Sanjay Kumar Ghosh, Durga Toshniwal, Alexander Mraz, Takehiro Kashiyama, and Yoshihide Sekimoto, "Deep learning-based road damage detection and classification for multiple countries", incorporated herein by reference in its entirety).

It is observed from the Table 2 that the dataset of the present system 100 is efficient in comparison to the conventional datasets.

TABLE 2

Summary of performance comparison

| Dataset | Problem Type | No of Classes | No of Samples |
| --- | --- | --- | --- |
| RTK (Thiago et al.) | Road type Classification | 3 (Asphalt, Paved, Unpaved) | 6297 |
| KITTI (Andreas et al.) | Autonomous Driving | 11 | 7481 |
| RobotCar (Will Maddern et al.) | Autonomous Driving | unspecified | unspecified |
| DIPLODOC (Michele et al.) | Road Segmentation | 3 | 865 |
| RQ Dataset (Martin et al.) | Road Condition Classification | 6 | 7247 |
| Gilberto dataset (Gilberto et al.) | Road Damage Detection | 8 | 48900 |
| Eldar dataset (Eldar et al.) | Road Type and Surface Classification | 6 | 12440 |
| RDD2020 (Deeksha et al.) | Road Damage Detection | 4 | 26336 |
| Dataset used in the present system 100 | Road Condition Classification | 4 (good, medium, bad, unpaved) | 17400 |

As shown in Table 2, the majority of publicly available datasets are not designed for the purpose of classification. Furthermore, most of the datasets that are built around quality assessment have an over-generalization issue where the entire dataset is reduced to three classes. Over-generalization results in an overlap between classes where images can claim membership in more than one class. In existing image processing systems (See: Martin Lank and Magda Friedjungova, "*road quality classification*", and Marco Leo, Giovanni M. Farinella, and Federico Tombari, "*Image Analysis and Processing*", ICIAP 2022, pages 553-563, Springer International Publishing 2022, incorporated herein by reference in its entirety), road quality was split into 5 classes which is more practical for real-world applications, however the existing image processing systems yield a complex structure, resulting less implementation in the real-world applications. Further, these systems only give the best performance by using an augmented dataset (75.55%).

In the present disclosure, the dataset consists of image road patches and each patch is categorized is divided into four classes: good, medium, bad and unpaved. The categories are characterized as follows:

Good: Top quality, smooth surface, devoid of any damage
Medium: Patches, moderate cracks. Any image that contains 3 to 5 cracks is designated medium.
Bad: Heavy cracks, potholes, big bumps. Any image that contains one or more deep and wide cracks is designated as bad. Any image that contains more than 5 cracks is designated as bad.

Unpaved: Non asphalt or non-concrete paved roads. If the road is not surfaced with asphalt or concrete, it is designated unpaved.

The overall condition of the road are determined based on a weighted sum of the classification of road images as shown in "weighted sum" column in FIG. 6.

The above categorizations and objective criteria for road conditions is a configuration parameter which can be defined during set up by a user of the system for assessing road surface quality.

Figure 8A:
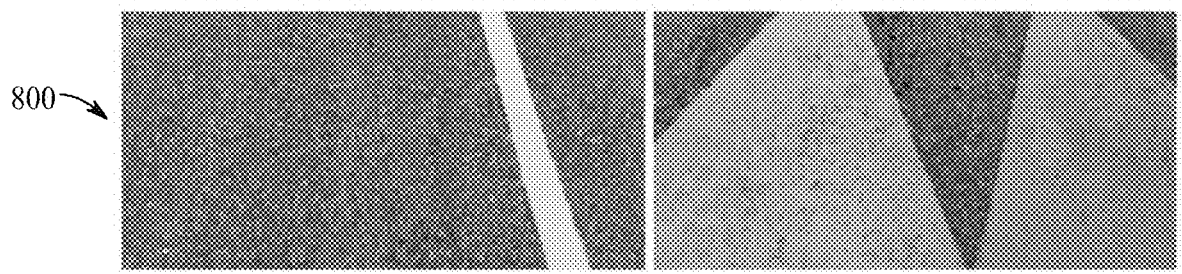
FIG. 8A shows exemplary images from a dataset corresponding to a class named good, according to certain embodiments.
Figure 8B:
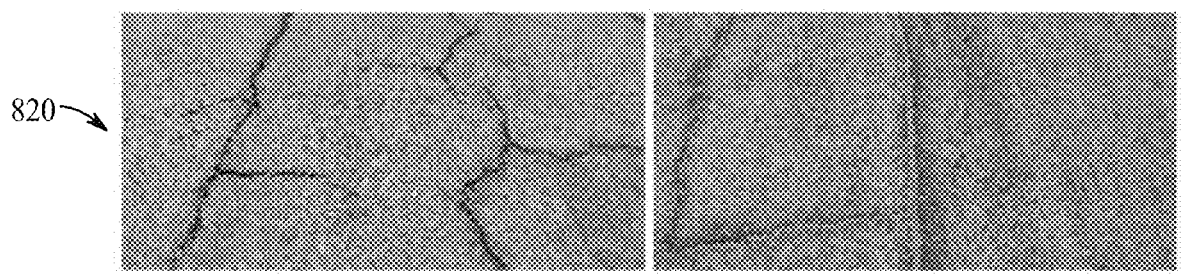
FIG. 8B shows exemplary images from the dataset corresponding to a class named medium, according to certain embodiments.
Figure 8C:
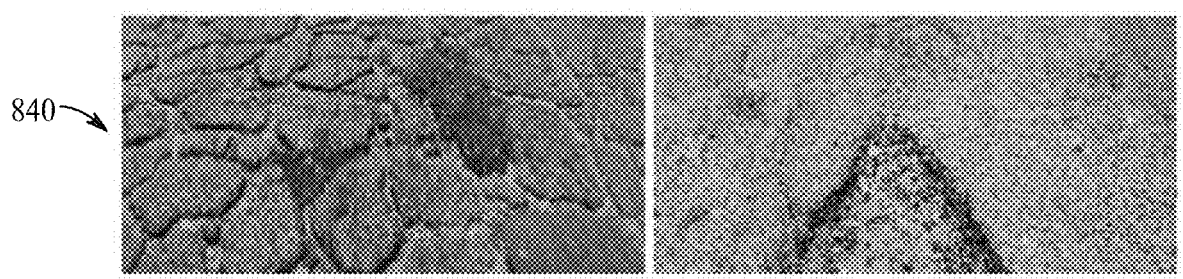
FIG. 8C shows exemplary images from the dataset corresponding to a class named bad, according to certain embodiments.
Figure 8D:
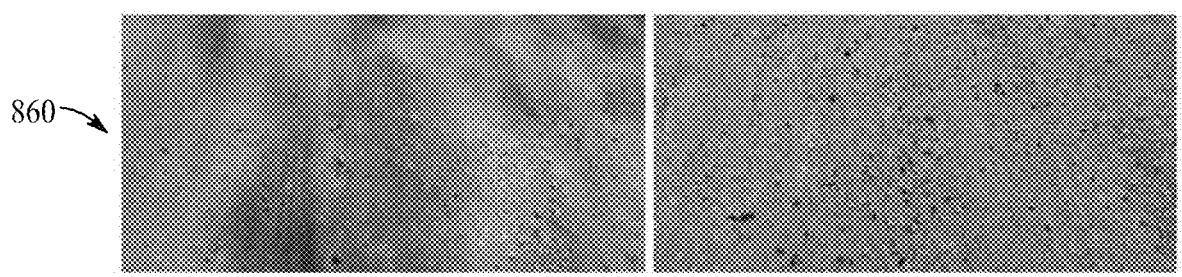
FIG. 8D shows exemplary images from the dataset corresponding to a class named unpaved, according to certain embodiments.

FIG. 8A to FIG. 8D show sample images from the dataset with the rows corresponding to good, medium, bad and unpaved, respectively. FIG. 8A shows exemplary images 800 from a dataset corresponding to a class named good. FIG. 8B shows exemplary images 820 from the dataset corresponding to a class named medium. FIG. 8C shows exemplary images 840 from the dataset corresponding to a class named bad. FIG. 8D shows exemplary images 860 from the dataset corresponding to a class named unpaved, according to certain embodiments.

Initially, dynamic images as videos were recorded on the wireless mobile device 106 attached to the vehicle 104. To process and categorize the data, a python script was used that displayed the video frame by frame. The python script is configured to either discard the image or save the image into one of the four directories corresponding to the four classes. For example, a total of 4070 images were categorized as good, 4864 as medium, 577 as bad and 1548 as unpaved, bringing the grand total to 11059 images.

In order to balance the dataset, different data augmentation techniques were used. A safe transformation, applied during augmentation, was a horizontal flipping. Every image can be viewed as a matrix of pixels, with each pixel containing some specific information, for example, color or brightness. Horizontal flipping is a data augmentation technique that takes both rows and columns of the matrix of pixels and flips them horizontally. Further, brightness and zoom variations to the images were also applied. An example of a possibly unsafe transformation was vertical flipping. The vertical flipping is a data augmentation technique that takes both rows and columns of the matrix of pixels and flips them vertically. As images were focused on a very immediate patch of the road surface in front of the vehicle 104, it was found that vertical flipping was relatively safe to be applied on the dataset. After augmentation, the dataset had 4070 images classified as good, 4864 as medium, 3899 as bad, and 4568 as unpaved, bringing the total to 17400 images.

A minimal amount of pre-processing was done on the image frames. Initially, the image frames were resized to 224×224 and then cropped from the top to remove interference such as traffic and curbs, bringing down the resolution of each image frame to 124×224. The dataset was divided into 70% for training, 20% for validation and 10% for testing.

In the system 100, the input image frames were passed through 3 convolutional layers with filters of size 5×5. The number of filters in the first convolutional layer is 32, 64 in the second layer and 128 in the third layer. The CNN is comprised of a convolutional layer, a pooling layer, and fully connected layers, where each layer is given a filter size, strides, and padding parameters based on the input. The strides are a parameter that defines how the filter convolves around the input volume. In image processing, the strides may denote the number of pixels shifts over an input matrix in the convolution. In some examples, the stride may be pre-defined, or the stride may be determined by the deep learning models based on historical processing. For example, all the strides were set to 2. The padding parameter provides an option to preserve the original input volume, which may be otherwise lost due to the application of convolution. The padding parameter may be optionally used in CNN. A max pooling operation is applied after each convolutional layer in an effort to reduce dimensionality. The max pooling operation helps in extracting sharp and smooth features from the image. The present disclosure uses Rectified Linear Unit (ReLU) activation (also known as ReLU activation function). According to the ReLU activation function, the function output is rectified for negative inputs. The input may be flattened to be given as input to the fully connected layer. In an example, the ReLU is used at each of the convolutional layers. Following the convolutional layers is a Flatten layer, which transforms the multi-dimensional tensors into a unidimensional tensor.

The images were then passed through three dense layers, followed by a dropout layer. The dropout layer was included to prevent overfitting. Finally, a dense layer with 4 units classified the images into the four classes. For example, a softmax activation function was used in the final layer because the softmax activation function produces probabilities, which fits well with the problem of road quality assessment, where the results can be objectively determined. The model was compiled with an Adam optimizer. The Adam optimizer performs adaptive moment estimation. The Adam optimizer is an optimization technique for gradient descent. The model of the preset disclosure is summarized in Table 3.

TABLE 3

Model summary

| Layer | Output Shape |
|---|---|
| Conv2D | (None, 62, 112, 32) |
| MaxPooling2D | (None, 31, 56, 32) |
| Conv2D | (None, 16, 28, 64) |
| MaxPooling2D | (None, 8, 14, 64) |
| Conv2D | (None, 4, 7, 128) |
| MaxPooling2D | (None, 2, 3, 128) |
| Flatten | (None, 256) |
| Dense | (None, 256) |
| Dense | (None, 64) |
| Dense | (None, 32) |
| Dropout | (None, 32) |
| Dense | (None, 4) |

Further, the present disclosure is configured to employ transfer learning, a highly effective approach to solving deep learning problems. The transfer learning is an approach that focuses on storing knowledge gained when solving one problem and applying the stored knowledge to a variety of related problems. An objective of the transfer learning idea is that if a pretrained model was trained on a dataset that was large and general enough, the features learned by the said model could function as a generic model.

To employ the pretrained model or network, the first step is feature extraction. The feature extraction in the transfer learning mainly includes extracting features from new samples by using the representations learned by a previously trained network. The newly extracted features are passed through a new classifier which is trained from scratch.

In the present disclosure, the VGG16 based model and the MobileNetV2 based model were selected. The VGG16 based model is widely regarded as one of the most exemplary vision model architectures to date. The VGG16 based model concentrates on 3×3 convolution layers with stride one and employs the same padding and max-pooling layers 2×2 filter with stride 2. The VGG16 based model maintains an order of convolution and max-pooling layers throughout the architecture. Finally, the VGG16 based model includes two FC (Fully Connected) layers and a softmax layer for output.

The MobileNetV2 based model employs a depthwise convolution and a pointwise convolution. The MobileNetV2 based model adds two new CNN layers: an inverted residual layer and a linear bottleneck layer. Due to lightweight nature of the MobileNetV2 based model, the MobileNetV2 based model may be utilized with the present system 100. In the present system, in both cases (VGG16 based model and the MobileNetV2 based model), the fully connected layers were removed from the end of the models and the flatten layer was added, followed by the dense layer with 256 units. Finally, the dense layer with 4 units was added. In an example, each unit directs to one of the classes from the dataset. Both models (VGG16 based model and the MobileNetV2 based model) were compiled with the Adam optimizer. An Adam optimizer is an extended version of stochastic gradient descent which may be implemented in various deep learning applications such as computer vision and natural language processing.

Before the pretrained networks were retrained, a preprocessing function was applied to both models (the VGG16 based model and the MobileNetV2 based model). The VGG16 based model was fed with the images processed by a VGG16 preprocessing function. Similarly, the MobileNetV2 based model was fed with the images processed by a MobileNetV2 based preprocessing function. This was done because both VGG16 and MobileNetV2 were trained on images that were passed through their respective preprocessing steps. The features learned by these models were learned from the preprocessed images. Hence, both models are fed with the data (preprocessed images) as per configuration of the models for the purpose of comparison with the custom model of the present disclosure.

To investigate the performance of machine learning models, three machine learning models (one custom model and two pretrained models) were deployed for carrying out the required simulations. For each machine learning model, a performance matrix was evaluated. The performance metrics such as classification accuracy, precision, recall and F1 score is the most common way to evaluate a machine learning model. The models were evaluated on the 20% of the dataset reserved for testing. The results obtained from the models are presented in Table 4.

TABLE 4

Results obtained from the three models.

| Model | Test Accuracy | Precision | Recall | F1 Score |
|---|---|---|---|---|
| Custom model | 85.77% | 0.87 | 0.85 | 0.86 |
| VGG Base model | 98.85% | 0.99 | 0.99 | 0.99 |
| MNet Base model | 98.59% | 0.99 | 0.99 | 0.99 |

Classification accuracy is the ratio of the total number of correct predictions to the total number of predictions made. The classification metric does not work well if the dataset is unbalanced. In terms of the classification accuracy, the custom model performed with the least accuracy with a score of 85.77%. The VGG16 based model and the MobileNetV2 based model using the modified image datasets performed significantly better, with a classification accuracy of around 98%.

Another way to evaluate a model's performance is by using precision, recall and F1 score. Precision is a ratio of the total number of true positives to the total number of positives predicted by a classifier. The precision reflects how reliable the model is in classifying samples as positive. When the precision is high, the model can be trusted when the model predicts a sample as positive. Recall is a ratio of the total number of true positives to the total number of samples. When the recall is high, it indicates the model can classify all the positive samples correctly as positive. The F1 score is a harmonic mean between the precision and the recall. Both the VGG16 based model and the MobileNetV2 based model when using the modified image datasets of the present disclosure have high precision, recall and F1 scores. These scores match with accuracy scores, proving the pretrained models performed as desired.

Further, an analysis of the performance of each of the three models using the confusion matrices was performed. The images misclassified by the VGG16 model and MNetV2 base model were also analyzed in an attempt to understand why the models may have erred on those images. The present system is focused on determining catastrophic misclassifications, i.e., misclassifications between radically different classes.

A confusion matrix, also known as an error matrix, is a technique that summarizes the performance of a classifier. Compared to the classification accuracy, the confusion matrix provides a better analysis of the predictions of the classifier. The rows in the confusion matrix represent the instances in the actual class, whereas the columns in the confusion matrix represent instances in the predicted class.

Figure 9A:
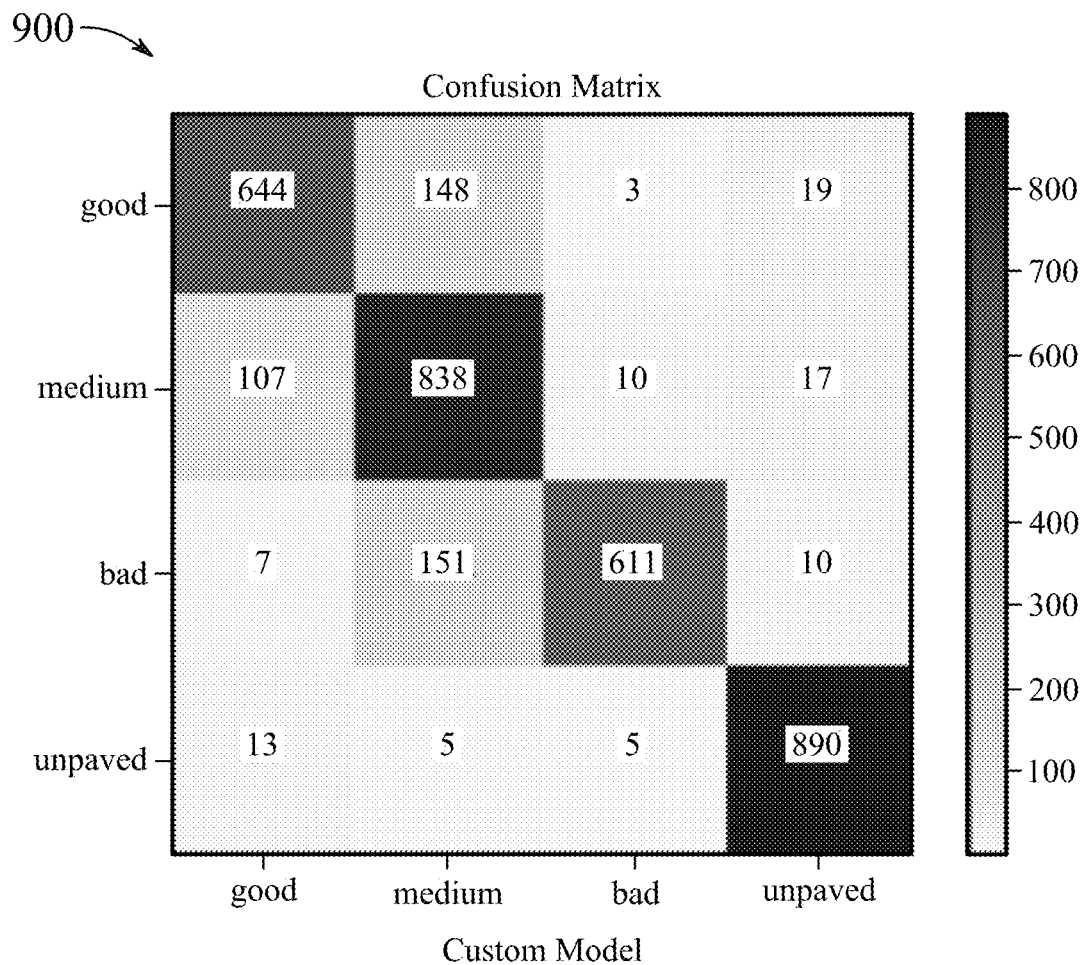
FIG. 9A shows a confusion matrix obtained from the custom model, according to certain embodiments.
Figure 9B:
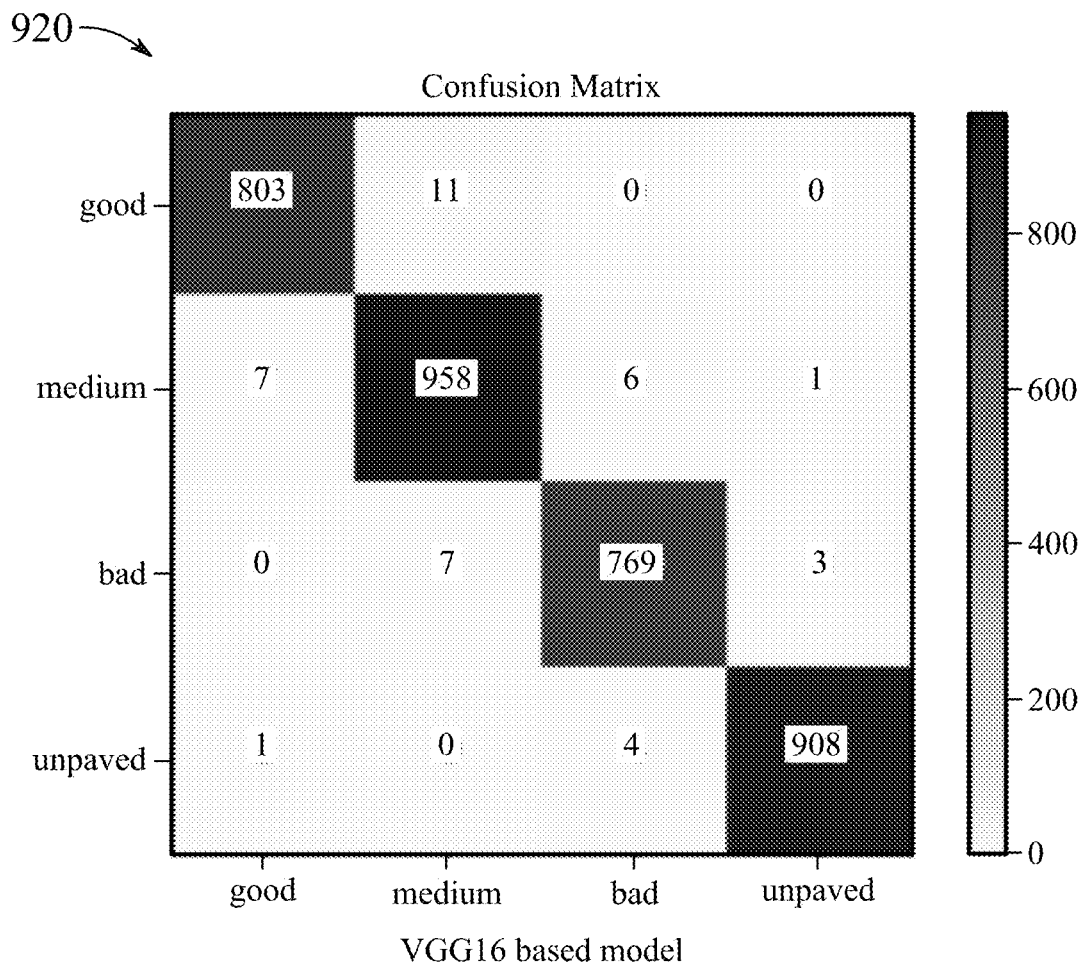
FIG. 9B shows a confusion matrix obtained from a VGG16 based model.
Figure 9C:
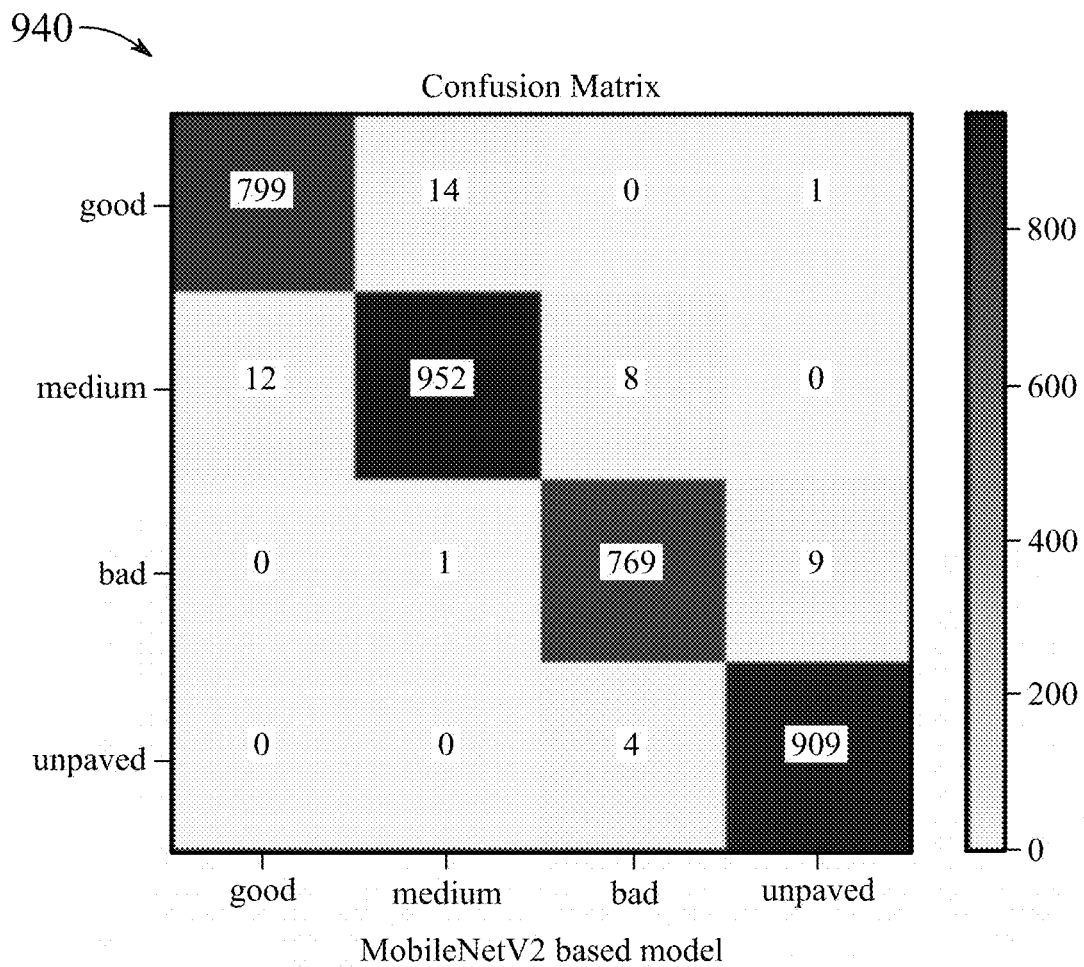
FIG. 9C shows a confusion matrix obtained from a MobileNetV2 based model.

FIG. 9A to FIG. 9C illustrate the confusion matrices obtained after testing all the models. The classes on the confusion matrices are arranged in decreasing order of road quality.

FIG. 9A shows the confusion matrix 900 obtained from the custom model. FIG. 9B shows the confusion matrix 920 obtained from the VGG16 based model. FIG. 9C shows the confusion matrix 940 obtained from the MobileNetV2 based model. From the confusion matrices, it can be seen that the maximum number of misclassifications occurred between the classes of adjacent quality. Further away from the diagonal, fewer misclassifications were made, as misclassifications occurring between classes of non-adjacent quality would indicate an error in the classifier predictions. Another trend is that the models made the fewest misclassifications on the samples from the unpaved class because the unpaved category is drastically different compared to the other classes.

The custom model misclassified about 14% of the samples. 82% of all the misclassifications happened between the good and the medium and between the medium and the bad, as shown in FIG. 9A. In other words, the custom model is not able to sufficiently distinguish between the good and the medium quality roads and between the medium and the bad quality roads, but did not make catastrophic misclassifications.

Figure 10A:
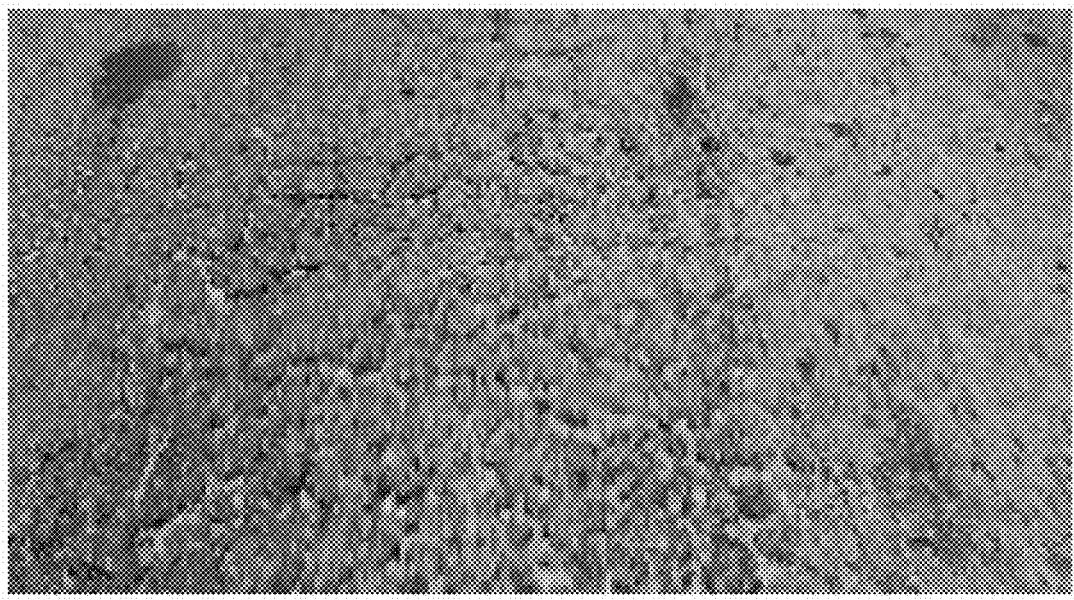
FIG. 10A shows an image misclassified by the VGG16 based model as unpaved.
Figure 10B:
FIG. 10B shows an image misclassified by the VGG16 based model as good.

The VGG16 based model made two catastrophic misclassifications: a medium sample was misclassified as unpaved, and an unpaved sample was misclassified as good. The rest of the classifications were non-catastrophic, i.e., a sample from a particular class was miscategorized to belong to an adjacent class. FIG. 10A shows an image 1000 that was misclassified by the VGG16 based model as unpaved. The image 1000 has moderate cracks. The road is clearly a medium quality road. The misclassification can be attributed to outliers in the dataset. FIG. 10B shows the image 1010 that was misclassified as good by the VGG16 based model. Unpaved roads are usually grainy. However, the unpaved road in the image 1020 is relatively smooth, resulting in an incorrect classification.

Figure 10C:
FIG. 10C shows an image misclassified by the MobileNetV2 based model as unpaved.

FIG. 10C shows an image 1030 misclassified by the MobileNetV2 based model as unpaved. The MobileNetV2 based model made only one catastrophic misclassification: a good sample was misclassified as unpaved. The rest of the classifications were non-catastrophic. The image 1020 appears to be very grainy and the lower half of the image seems to be blurred. The image 1030 has some of the characteristics of an unpaved road, therefore has been misclassified.

In the present disclosure, most of the misclassifications occurred between the classes where an overlap is possible. For example, the samples that are on the lower end of good quality may have been classified as the medium class by the classifier. A few misclassifications occurred between radically unrelated classes. These misclassifications can be attributed to outliers and edge cases. Outliers can be filtered, but the edge cases are more challenging to resolve. One possible edge case is an image where the road is transitioning from one quality to another quality. Blurry images, unideal lighting conditions, etc., are some more possible edge cases. Larger and more comprehensive datasets with a sufficient number of samples that represent edge cases are needed to properly classify the road surfaces.

According to the present disclosure, multiple systems can be built around the present system 100 (road quality classifier). The requirements for building the system 100 are as follows:
 1. The camera 108 is attached to the vehicle 104 at a mounting position suited for viewing the road surface. The videos collected by the camera 108 are processed and the image frames are classified either in real time or on a schedule.
 2. The images and their respective classifications are stored in the database 134 along with the geotag of the locations at which the images were captured.

The aforementioned steps help to build the database of road quality classifications which serves as a base for the system 100 of the present disclosure.

The system 100 of the present disclosure can serve to reinforce and improve ADAS systems. For example, the classifier can assess road conditions in real time and adjust drive settings accordingly. Based on road quality, the system 100 can also suggest a better path to a destination as compared to a current path of travel.

According to the present disclosure, the deep learning models based system may be used to maintain and monitor road quality. The reliable road quality classifier is built based on the deep learning model. The initial dataset was generated by attaching the smartphone to the vehicle 104 and recording videos. The frames from the videos were manually labelled and stored. The collected dataset was balanced using augmentation techniques. Three different architectures were used in the present disclosure, one of which was built from the ground up and the remaining two were built using pretrained networks, namely the VGG16 and MobileNetV2 models. Each of the three architectures was trained on the dataset. The custom model performed the worst with an accuracy score of 85.77%, however the VGG-based model and the MobileNetV2 model scored around 98%. Precision, recall and F1 scores were also high.

The road monitoring approach of the present disclosure can be developed further in multiple ways. The dataset can be extended from the city level to the national level and further to the global level. The dataset expansion will require a re-exploration of how image processing is used and deep learning concepts to solve the problem of road classification.

A first embodiment of the present disclosure is described with respect to FIG. 1 to FIG. 10. The first embodiment describes the system 100 for assessing road surface quality. The system 100 includes a plurality of vehicles 104 and a plurality of wireless mobile devices 106. Each wireless mobile device 106 is mounted in one of the plurality of vehicles 104. Each wireless mobile device 106 includes a camera 108, a location receiver 112, an image processor 110, a wireless communications transceiver 114, a computing device 116 connected to the camera 108, the location receiver 112, the image processor 110, and the wireless communications transceiver 114. The computing device 116 includes a circuitry 118, a memory 120 including program instructions, and at least one processor 122 configured to execute the program instructions. The wireless mobile device 106 includes a road surface classifying computer application 124 stored in the memory 120. The system 100 further includes a remote server 130 operatively connected with each wireless communications transceiver 114. The remote server 130 is configured to store a road surface classifying web application 132. The road surface classifying computer application 124 of each wireless mobile device 106 is configured to register with the road surface classifying web application 132. Each wireless mobile device 106 is configured to actuate the camera 108 to record videos of the road surface, process the videos to extract images, classify the images into road conditions, record a location of each of the images, generate a data packet including an identification of the wireless mobile device 106, a time stamp of the data packet, the location, the road conditions, and the images, and transmit the data packet to the remote server 130. The system 100 further includes a database 134 operatively connected to the remote server 130 and an interactive map 136 operatively connected to the road surface classifying web application 132. The remote server 130 is configured to receive the data packet from each wireless mobile device 106 and store the identification of the wireless mobile device 106, the time stamp of the data packet, the location of the wireless mobile device 106, the road conditions, and the images in the database 134. The road surface classifying web application 132 is configured to superimpose the time stamp of the data packet, the location, the road conditions, and the images on the interactive map 136.

In an aspect, the system 100 further includes a light sensor 140 mounted on the wireless mobile device 106. The light sensor 140 is configured to measure an ambient light level. The computing device 116 of each wireless mobile device 106 is configured to compare the ambient light level to a threshold and actuate the camera 108 to record images of the road surface when the ambient light level is greater than the threshold.

The location receiver 112 is a global positioning system (GPS) receiver.

In an aspect, the program instructions include a machine learning model configured to identify a quality of each image and discard any distorted images or unclear images.

In an aspect, the program instructions further include a deep learning classifier trained to classify the images.

In an aspect, the deep learning classifier is a convolutional neural network.

In an aspect, the image processor 110 is configured to resize and normalize the images to fit a format of the deep learning classifier.

In an aspect, the wireless mobile device 106 is a smartphone.

In an aspect, the wireless mobile device 106 is configured to actuate the camera 108 to record about 20 images of the road surface per kilometer of the road surface travelled by the vehicle 104.

In an aspect, the computing device 116 is configured to transmit the data packet to the remote server 130 in real time.

In an aspect, the computing device 116 is configured to store the data packet in the memory 120 until a network connection to the remote server 130 is available.

In an aspect, the computing device 116 is configured store the data packet in the memory 120 for a preconfigured time interval and send the data packet to the remote server 130 when the preconfigured time interval expires.

In an aspect, the road surface classifying web application 132 is configured to display the road conditions as color coded dots. A color of each color coded dot indicates a severity of the road condition, wherein selection of the color coded dot displays a score of the severity of the road condition.

In an aspect, the road surface classifying web application 132 is configured to generate a prioritized list of roads that require maintenance work, wherein the prioritized list is based on a traffic volume and the location of the road condition.

A second embodiment of the present disclosure is described with respect to FIG. 1 to FIG. 10. The second embodiment describes a method for assessing road surface quality. The method includes actuating, by a wireless mobile device 106 mounted on a vehicle 104 travelling on the road surface, the wireless mobile device 106 including a camera 108, an image processor 110, a location receiver 112, a memory 120 storing program instructions, a deep learning classifier and a processor 122 configured to execute the program instructions, wherein the program instructions include a road surface classifying computer application 124, the camera 108 to record images of the road surface. The method 1200 includes extracting, by the image processor, images from the videos, recording, by the location receiver 112, a location of each of the images, discarding, by the processor, distorted images and unclear images, resizing and formatting, by the image processor 110, the images, classifying, by the deep learning classifier, the images into road conditions, and generating, by the wireless mobile device 106, a data packet including an identification of the wireless mobile device 106, a time stamp of the data packet, the locations of the images, the road conditions, and the images. The method further includes transmitting, by the wireless mobile device 106, the data packet to a remote server 130, wherein the remote server 130 includes a road surface classifying web application 132 and is operatively connected to a database 134. The method further includes receiving, by the remote server 130, the data packet from each wireless mobile device 106 and storing the identification of the wireless mobile device 106, the time stamp of the data packet, the location of the wireless mobile device 106, the road conditions, and the images in the database 134. The method further includes superimposing, by the road surface classifying web application 132, the time stamp of the data packet, the location, the road conditions, and the images on an interactive map 136.

In an aspect, the method further includes registering, through the remote server 130, the wireless mobile device 106 with the road surface classifying web application 132.

In an aspect, the method further includes accessing from the database 134, by the road surface classifying web application 132, the time stamps, the locations, the images, and the road conditions received from the plurality of wireless mobile devices 106 registered with the road surface classifying web application 132. The method further includes averaging, by the road surface classifying web application 132, the road conditions for each location, and displaying the averaged road conditions as color-coded dots on the interactive map 136. A color of each color coded dot indicates a severity of the road condition, wherein selecting, by a user, color coded dot, displays a score of the severity of the road condition and a selected image of the road condition.

In an aspect, the method further includes generating, by the road surface classifying web application 132, a prioritized list of roads that require maintenance work, wherein the prioritized list is based on a traffic volume and the location of the road condition.

A third embodiment of the present disclosure is described with respect to FIG. 1 to FIG. 10. The third embodiment describes a method 1300 for assessing quality of a plurality of road surfaces. The method further includes receiving, by a road surface classifying web application 132 stored in a remote server 130, data packets from each of a plurality of wireless mobile devices mounted on vehicles 104 travelling on one of the road surfaces. Each data packet includes time-stamped images of the road surface, locations of the images and classified road conditions based on the images. The method further includes storing the time-stamped images of the road surface, the locations of the images and the road conditions in a database 134 operatively connected with the road surface classifying web application 132. The method further includes averaging, by the road surface classifying web application 132, the road conditions for each location and superimposing, by the road surface classifying web application 132, the time stamp of the data packet, the location, the road conditions, and the images on an interactive map 136.

In an aspect, the method further includes applying, by each of the wireless mobile devices 106, images recorded by the wireless mobile device 106 to a deep learning classifier included in the wireless mobile device 106 and classifying the images into road conditions, wherein each road condition identifies a severity of damage to the road surface. The method further includes averaging, by the road surface classifying web application 132, the road conditions for each location, and displaying, on the interactive map 136, the averaged road conditions as color coded dots. A color of each color coded dot indicates a severity of the road condition, wherein selecting, by a user, the color coded dot, displays a score of the severity of the road condition and a selected image of the road condition.

The systems and methods of the present disclosure are designed for large-scale road surface condition assessment by integrating the road surface monitoring application with existing mature technologies, such as servers, databases and position monitoring systems (Google Maps, GPS, GPRS, PMS, and the like). The systems and methods of the present disclosure are reliable, low cost and easily implementable. Because of local classification by the wireless mobile devices 106, each device transmits only selected categories of images and automatically discards bad quality images, thus the storage and transmission data loads are not onerous.

The systems and methods of the present disclosure are not limited to region. The road surface monitoring application can be used by anyone with a smartphone and support the community and other stakeholders with the road surface assessment data over a district, city or country level.

Next, further details of the hardware description of the computing environment of FIG. 1A-FIG. 1B according to exemplary embodiments is described with reference to FIG. 11.

Figure 11:
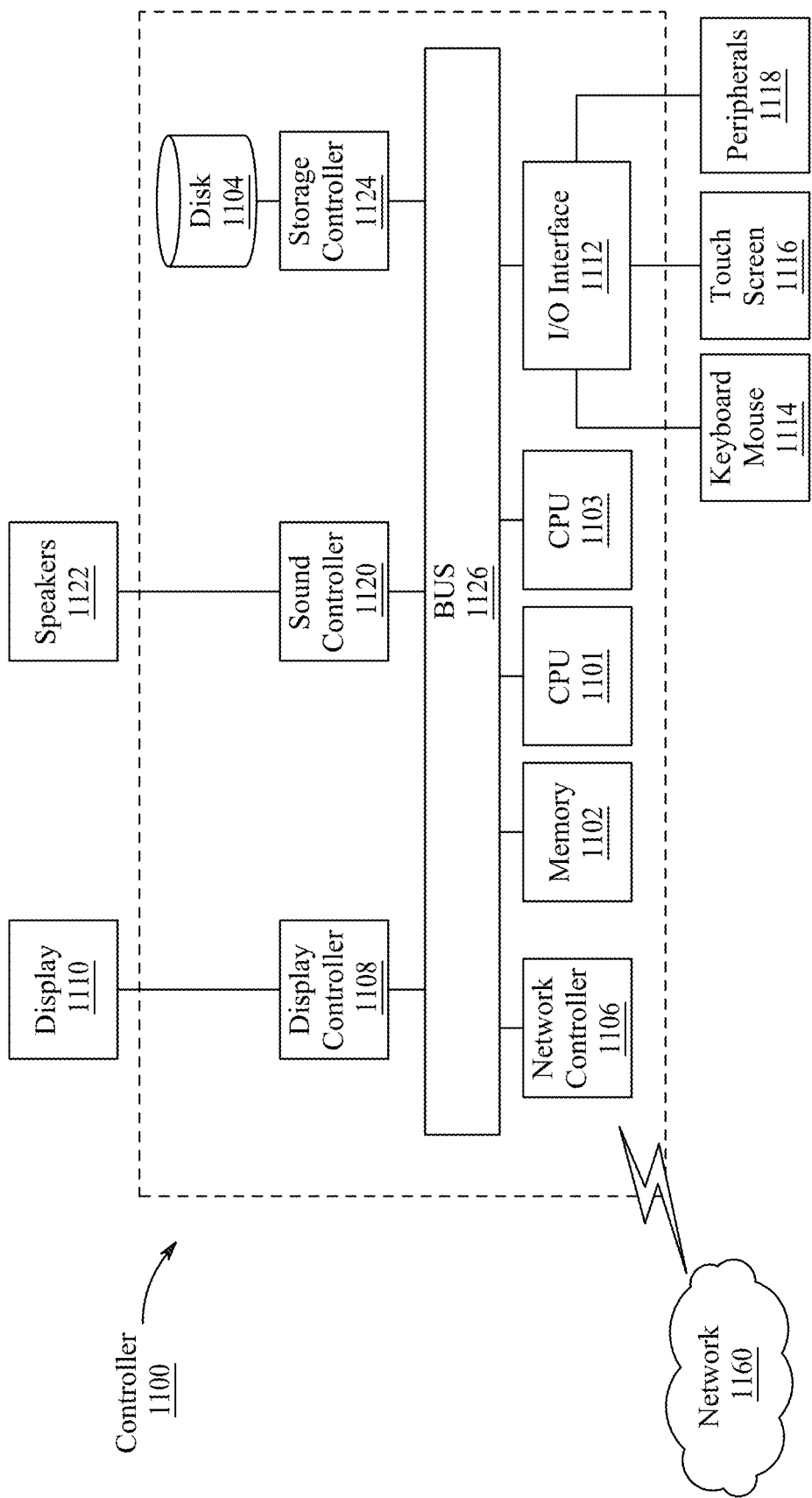
FIG. 11 is an illustration of a non-limiting example of details of computing hardware used in the system, according to certain embodiments.

In FIG. 11, a controller 1100 is described as representative of the system 100 for monitoring the road surface of FIG. 1A-FIG. 1B in which the wireless mobile device 106, and the computing device 116 are the computing devices each which includes a CPU 1101 which performs the processes described above/below. FIG. 11 is an illustration of a non-limiting example of details of computing hardware used in the computing system, according to exemplary aspects of the present disclosure. In FIG. 11, a controller 1100 is described which is a computing device (that includes the wireless mobile device 106) and includes a CPU 1101 which performs the processes described above/below. The process data and instructions may be stored in memory 1102. These processes and instructions may also be stored on a storage medium disk 1104 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1101, 1103 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 1101 or CPU 1103 may be a Xenon or Core processor from Intel of America or an Opteron processor from AMD of America, or may be other processor types that would be recognized by one of ordinary skill in the art. Alternatively, the CPU 1101, 1103 may be implemented on an FPGA, ASIC, PLD or using discrete logic circuits, as one of the ordinary skill in the art would recognize. Further, CPU 1101, 1103 may be implemented as multiple processors cooperatively working in parallel to perform the instructions of the inventive processes described above.

The computing device in FIG. 11 also includes a network controller 1106, such as an Intel Ethernet PRO network interface card from Intel Corporation of America, for interfacing with network 1160. As can be appreciated, the network 1160 can be a public network, such as the Internet, or a private network such as an LAN or WAN network, or any combination thereof and can also include PSTN or ISDN sub-networks. The network 1160 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the computing device such as Sound Blaster X-Fi Titanium from Creative, to interface with speakers/microphone 1122 thereby providing sounds and/or music.

The general-purpose storage controller 1124 connects the storage medium disk 1104 with communication bus 1126, which may be an ISA, EISA, VESA, PCI, or similar, for interconnecting all of the components of the computing device. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 12.

Figure 12:
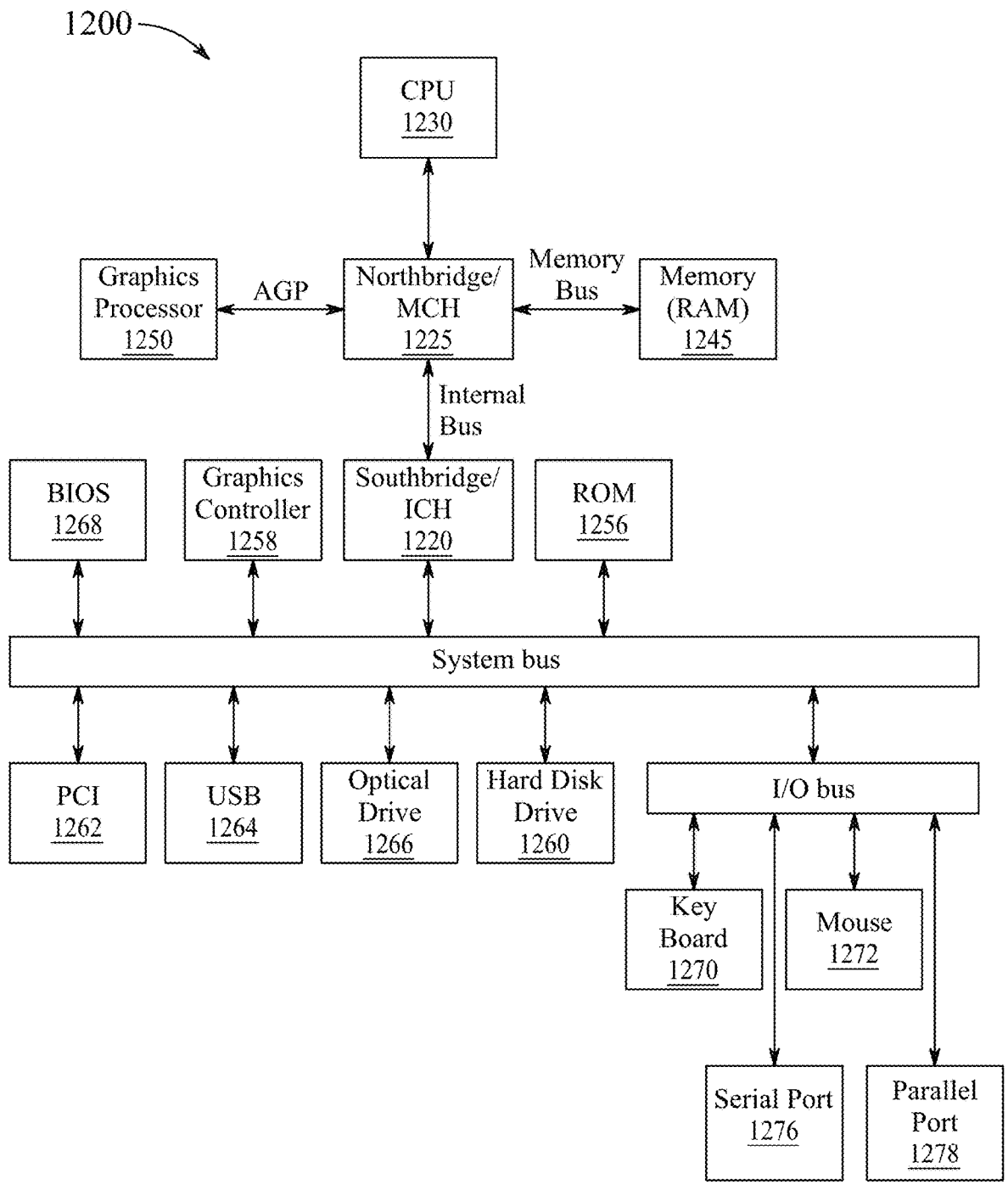
FIG. 12 is an exemplary schematic diagram of a data processing system used within the system, according to certain embodiments.

FIG. 12 shows a schematic diagram of a data processing system 1200 used within the computing system, according to exemplary aspects of the present disclosure. The data processing system 1200 is an example of a computer in which code or instructions implementing the processes of the illustrative aspects of the present disclosure may be located.

In FIG. 12, data processing system 1280 employs a hub architecture including a north bridge and memory controller hub (NB/MCH) 1225 and a south bridge and input/output (I/O) controller hub (SB/ICH) 1220. The central processing unit (CPU) 1230 is connected to NB/MCH 1225. The NB/MCH 1225 also connects to the memory 1245 via a memory bus, and connects to the graphics processor 1250 via an accelerated graphics port (AGP). The NB/MCH 1225 also connects to the SB/ICH 1220 via an internal bus (e.g., a unified media interface or a direct media interface). The CPU Processing unit 1230 may contain one or more processors and even may be implemented using one or more heterogeneous processor systems.

Figure 13:
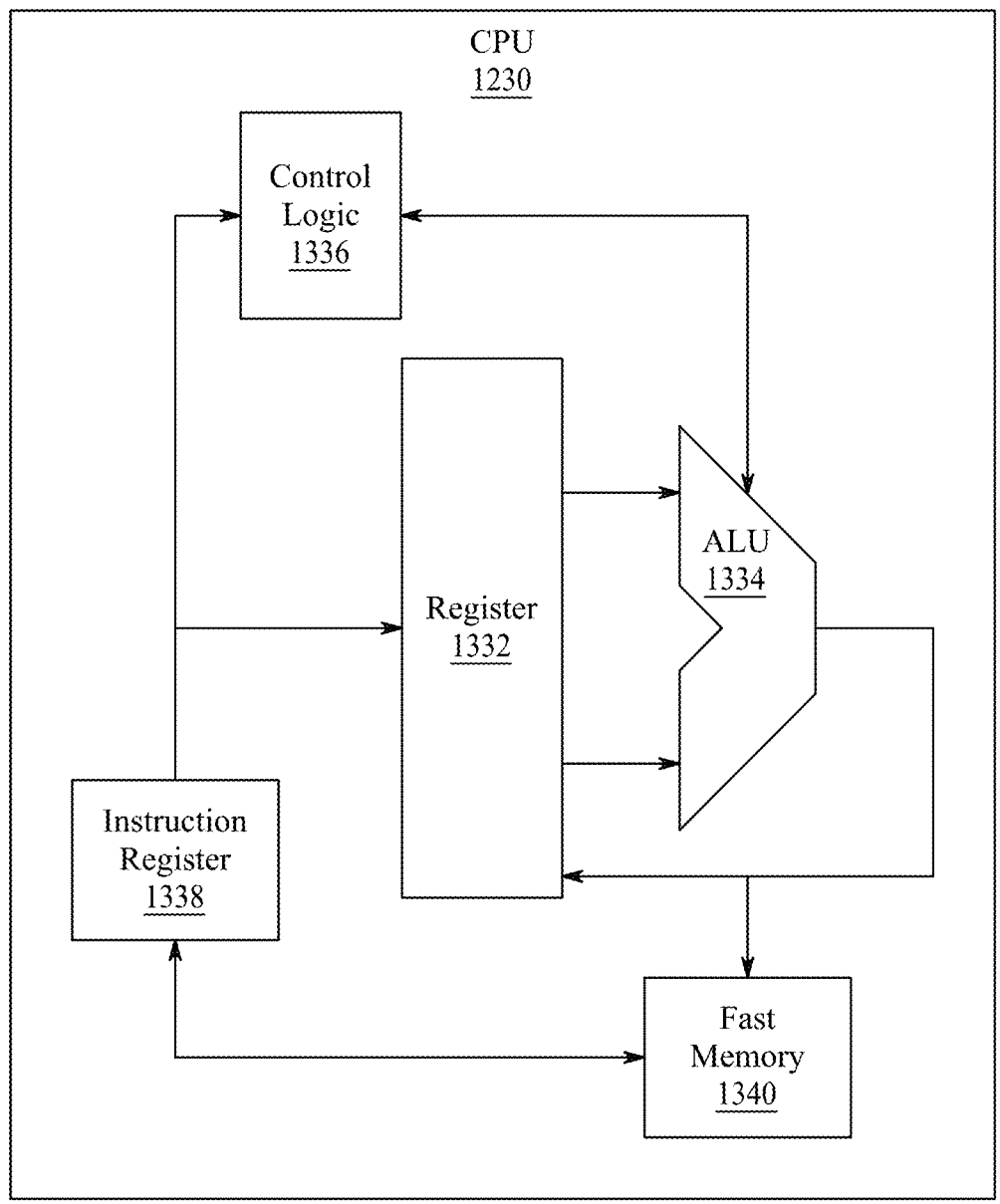
FIG. 13 is an exemplary schematic diagram of a processor used with the system, according to certain embodiments.

For example, FIG. 13 shows one aspects of the present disclosure of CPU 1230. In one aspects of the present disclosure, the instruction register 1338 retrieves instructions from the fast memory 1340. At least part of these instructions is fetched from the instruction register 1338 by the control logic 1336 and interpreted according to the instruction set architecture of the CPU 1230. Part of the instructions can also be directed to the register 1332. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1334 that loads values from the register 1332 and performs logical and mathematical operations on the loaded values according to the instructions. The results from these operations can be feedback into the register and/or stored in the fast memory 1340. According to certain aspects of the present disclosures, the instruction set architecture of the CPU 1230 can use a reduced instruction set architecture, a complex instruction set architecture, a vector processor architecture, a very large instruction word architecture.

Furthermore, the CPU 1230 can be based on the Von Neuman model or the Harvard model. The CPU 1230 can be a digital signal processor, an FPGA, an ASIC, a PLA, a PLD, or a CPLD. Further, the CPU 1230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 12, the data processing system 1280 can include that the SB/ICH 1220 is coupled through a system bus to an I/O Bus, a read only memory (ROM) 1256, universal serial bus (USB) port 1264, a flash binary input/output system (BIOS) 1268, and a graphics controller 1258. PCI/PCIe devices can also be coupled to SB/ICH 1220 through a PCI bus 1262.

The PCI devices may include, for example, Ethernet adapters, add-in cards, and PC cards for notebook computers. The Hard disk drive 1260 and CD-ROM 1256 can use, for example, an integrated drive electronics (IDE) or serial advanced technology attachment (SATA) interface. In one aspect of the present disclosure the I/O bus can include a super I/O (SIO) device.

Further, the hard disk drive (HDD) 1260 and optical drive 1266 can also be coupled to the SB/ICH 1220 through a system bus. In one aspects of the present disclosure, a keyboard 1270, a mouse 1272, a parallel port 1278, and a serial port 1276 can be connected to the system bus through the I/O bus. Other peripherals and devices that can be connected to the SB/ICH 1220 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 14:
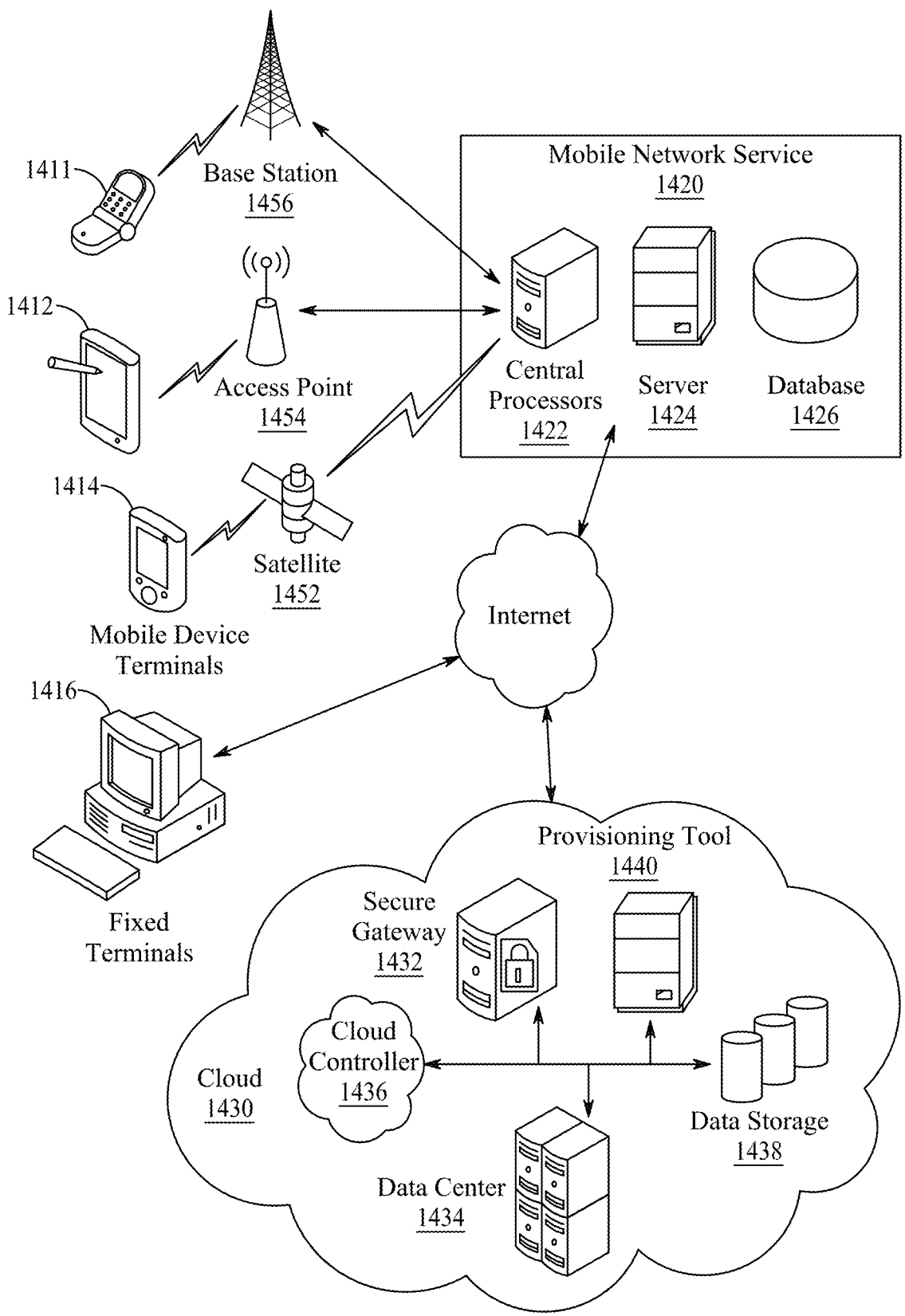
FIG. 14 is an illustration of a non-limiting example of distributed components which may share processing with a controller of the system, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 14, in addition to various human interface and communication devices (e.g., display monitors, smart phones, tablets, personal digital assistants (PDAs)). More specifically, FIG. 14 illustrates client devices including smart phone 1411, tablet 1412, mobile device terminal 1414 and fixed terminals 1416. These client devices may be commutatively coupled with a mobile network service 1420 via base station 1456, access point 1454, satellite 1452 or via an internet connection. Mobile network service 1420 may comprise central processors 1422, server 1424 and database 1426. Fixed terminals 1416 and mobile network service 1420 may be commutatively coupled via an internet connection to functions in cloud 1430 that may comprise security gateway 1432, data center 1434, cloud controller 1436, data storage 1438 and provisioning tool 1440. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A system for assessing road surface quality, comprising:
a plurality of wireless mobile devices, wherein each wireless mobile device is mounted in one of a plurality of vehicles, wherein each vehicle is configured to travel on a road surface, wherein each wireless mobile device includes:
a camera;
a location receiver;
an image processor;
a wireless communications transceiver;
a computing device connected to the camera, the location receiver, the image processor, and the wireless communications transceiver, wherein the computing device includes a circuitry, a memory including program instructions, and at least one processor configured to execute the program instructions; and
a road surface classifying computer application stored in the memory;
a remote server operatively connected with each wireless communications transceiver, wherein the remote server is configured to store a road surface classifying web application, wherein the road surface classifying computer application of each wireless mobile device is configured to register with the road surface classifying web application;
wherein each wireless mobile device is configured to:
actuate the camera to record videos of the road surface:
process the videos to extract images;
classify the images into road conditions;
record a location of each of the images;
generate a data packet including an identification of the wireless mobile device, a time stamp of the data packet, the location, the road conditions, and the images; and
transmit the data packet to the remote server;
a database operatively connected to the remote server;
a light sensor mounted externally on the wireless mobile device, wherein the light sensor is configured to measure an ambient light level; and
wherein the computing device of each wireless mobile device is configured to compare the ambient light level to a threshold and actuate the camera to record videos of the road surface when the ambient light level is greater than the threshold; and
an interactive map operatively connected to the road surface classifying web application;
wherein the remote server is configured to receive the data packet from each wireless mobile device and store the identification of the wireless mobile device, the time stamp of the data packet, the location of the wireless mobile device, the road conditions, and the images in the database; and wherein the road surface classifying web application is configured to superimpose the time stamp of the data packet, the location, the road conditions, and the images on the interactive map.

2. The system of claim 1, wherein the location receiver is a global positioning system (GPS) receiver.

3. The system of claim 1, wherein the program instructions further include a machine learning model configured to identify a quality of each image and discard distorted images and unclear images.

4. The system of claim 3, wherein the program instructions further include a deep learning classifier trained to classify the images.

5. The system of claim 4, wherein the deep learning classifier is a convolutional neural network.

6. The system of claim 4, wherein the image processor is configured to resize and normalize the images to fit a format of the deep learning classifier.

7. The system of claim 1, wherein the wireless mobile device is a smartphone.

8. The system of claim 1, wherein the wireless mobile device is configured to actuate the camera to record about 20 videos of the road surface per kilometer of the road surface travelled by the vehicle.

9. The system of claim 1, wherein the computing device is configured to transmit the data packet to the remote server in real time.

10. The system of claim 1, wherein the computing device is configured store the data packet in the memory until a network connection to the remote server is available.

11. The system of claim 1, wherein the computing device is configured to store the data packet in the memory for a preconfigured time interval and send the data packet to the remote server when the preconfigured time interval expires.

12. The system of claim 1, wherein the road surface classifying web application is configured to display the road conditions as color coded dots, wherein a color of each color coded dot indicates a severity of the road condition, wherein selection of the color coded dot displays a score of the severity of the road condition.

13. The system of claim 1, wherein the road surface classifying web application is configured to generate a prioritized list of roads that require maintenance work, wherein the prioritized list is based on a traffic volume and the location of the road condition.

14. A method for assessing road surface quality, comprising:

actuating, by a wireless mobile device mounted on a vehicle travelling on the road surface, the wireless mobile device including a camera, an image processor, a location receiver, a memory storing program instructions, a deep learning classifier and a processor configured to execute the program instructions, wherein the program instructions include a road surface monitoring computer application, the camera to record videos of the road surface;

extracting, by the image processor, images from the videos;

recording, by the location receiver, a location of each of the images;

discarding, by the processor, distorted images and unclear images;

resizing and formatting, by the image processor, the images;

classifying, by the deep learning classifier, the images into road conditions;

generating, by the wireless mobile device, a data packet including an identification of the wireless mobile device, a time stamp of the data packet, the locations of the images, the road conditions, and the images;

transmitting, by the wireless mobile device, the data packet to a remote server, wherein the remote server includes a road surface classifying web application and is operatively connected to a database;

receiving, by the remote server, the data packet from the wireless mobile device and storing the identification of the wireless mobile device, the time stamp of the data packet, the location of the wireless mobile device, the road conditions, and the images in the database; and superimposing, by the road surface classifying web application, the time stamp of the data packet, the location, the road conditions, and the images on an interactive map;

wherein, a light sensor is mounted externally on the wireless mobile device, the light sensor being configured to measure an ambient light level; and each wireless mobile device is configured to compare the ambient light level to a threshold and actuate the camera to record videos of the road surface when the ambient light level is greater than the threshold.

15. The method of claim 14, further comprising:

registering, through the remote server, the wireless mobile device with the road surface classifying web application.

16. The method of claim 15, further comprising:

accessing from the database, by the road surface classifying web application, the time stamps, the locations, the images, and the road conditions received from the wireless mobile device registered with the road surface classifying web application;

averaging, by the road surface classifying web application, the road conditions for each location; and displaying, on the interactive map, the averaged road conditions as color coded dots, wherein a color of each color coded dot indicates a severity of the road condition, wherein selecting, by a user, the color coded dot, displays a score of the severity of the road condition and a selected image of the road condition.

17. The method of claim 16, further comprising:

generating, by the road surface classifying web application, a prioritized list of roads that require maintenance work, wherein the prioritized list is based on a traffic volume and the location of the road condition.

18. A method for assessing the quality of a plurality of road surfaces, comprising:

receiving, by a road surface classifying web application stored in a remote server, data packets from each of a plurality of wireless mobile devices mounted on vehicles travelling on one of the road surfaces, each data packet including time-stamped images of the road surface, locations of the images and classified road condition based on the images;

storing the time-stamped images of the road surface, the locations of the images and the road conditions in a database operatively connected with the road surface classifying web application;

averaging, by the road surface classifying web application, the road conditions for each location; and superimposing, by the road surface classifying web application, the time stamp of the data packet, the location, the road conditions, and the images on an interactive map;

wherein, a light sensor is mounted externally on the wireless mobile device, the light sensor being configured to measure an ambient light level; and each wireless mobile device is configured to compare the ambient light level to a threshold and actuate the camera to record videos of the road surface when the ambient light level is greater than the threshold.

19. The method of claim 18, further comprising:

applying, by each of the wireless mobile devices, images recorded by the wireless mobile device to a deep learning classifier included in the wireless mobile device;

classifying the images into road conditions, wherein each road condition identifies a severity of damage to the road surface;

averaging, by the road surface classifying web application, the road conditions for each location; and displaying, on the interactive map, the averaged road conditions as color coded dots, wherein a color of each color coded dot indicates a severity of the road condition, wherein selecting, by a user, the color coded dot, displays a score of the severity of the road condition and a selected image of the road condition.

* * * * *